United States Patent
Inoue et al.

(10) Patent No.: US 12,516,043 B2
(45) Date of Patent: Jan. 6, 2026

(54) STIRIPENTOL DERIVATIVE AND USE THEREOF

(71) Applicant: National University Corporation Okayama University, Okayama (JP)

(72) Inventors: Tsuyoshi Inoue, Okayama (JP); Nagisa Sada, Okayama (JP)

(73) Assignee: NATIONAL UNIVERSITY CORPORATION OKAYAMA UNIVERSITY, Okayama (JP)

( * ) Notice: Subject to any disclaimer, the term of this patent is extended or adjusted under 35 U.S.C. 154(b) by 452 days.

(21) Appl. No.: 18/018,792

(22) PCT Filed: Jul. 30, 2021

(86) PCT No.: PCT/JP2021/028307
§ 371 (c)(1),
(2) Date: Jan. 30, 2023

(87) PCT Pub. No.: WO2022/025242
PCT Pub. Date: Feb. 3, 2022

(65) Prior Publication Data
US 2023/0303543 A1  Sep. 28, 2023

(30) Foreign Application Priority Data
Jul. 31, 2020 (JP) .................................. 2020-129956

(51) Int. Cl.
| C07D 409/10 | (2006.01) |
| A61P 25/08 | (2006.01) |
| C07D 317/50 | (2006.01) |
| C07D 405/10 | (2006.01) |

(52) U.S. Cl.
CPC ............ C07D 409/10 (2013.01); A61P 25/08 (2018.01); C07D 317/50 (2013.01); C07D 405/10 (2013.01)

(58) Field of Classification Search
None
See application file for complete search history.

(56) References Cited

U.S. PATENT DOCUMENTS

2018/0015068 A1   1/2018  Inoue et al.

FOREIGN PATENT DOCUMENTS

| CN | 108276376 | 7/2018 |
| FR | 2 253 503 | 7/1975 |
| WO | 2014/115764 | 7/2014 |
| WO | 2016/129583 | 8/2016 |

OTHER PUBLICATIONS

CAS RN 58344-93-7 (entered into STN on Nov. 16, 1984) (Year: 1984).*

(Continued)

*Primary Examiner* — Craig D Ricci
(74) *Attorney, Agent, or Firm* — Wenderoth, Lind & Ponack, L.L.P.

(57) ABSTRACT

The present invention provides a novel compound that can be used as a lactate dehydrogenase inhibitor or an active ingredient of a medicament such as an antiepileptic agent and an anti-cancer agent, and particularly, provides a novel compound excellent in metabolic stability. The novel compound according to the present invention is a compound represented by the following formula (1). In formula (1), R represents any substituent (for example, a monovalent substituent of an aromatic or non-aromatic 3 to 14-membered ring which may be unsubstituted or substituted and monocyclic or polycyclic), $R^a$, $R^b$, $R^c$, $R^d$, $R^e$, $R^f$, $R^g$, $R^h$ and $R^i$ each represent a hydrogen atom or any substituent (for example, $R^a$ to $R^i$ are all hydrogen atoms, or $R^e$, $R^f$, $R^g$, $R^h$ and $R^i$ are hydrogen atoms and at least one of $R^a$, $R^b$, $R^c$ and $R^d$ is any substituent).

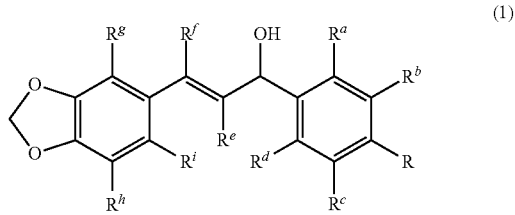

(1)

7 Claims, 9 Drawing Sheets

(56) References Cited

OTHER PUBLICATIONS

CAS RN 1624736-04-4 (entered into STN on Sep. 23, 2014) (Year: 2014).*
Database Chemabs [Online], Chemical Abstracts Service, Columbus, Ohio, US; XP93094505, Database accession No. 2018:1304867 * compound with CAS registry No. 2241993-57-5 *, 2018.
Database Chemabs [Online] Chemical Abstracts Service, Columbus, Ohio, US; XP93094509, Database accession No. 2017:313512 * compound with CAS registry No. 2088834-44-8 *, 2017.
Database Chemabs [Online] Chemical Abstracts Service, Columbus, Ohio, US; XP93094512, Database accession No. 2015:342521 * compound with CAS registry Nos. 1771690-83-5, 1771690-84-6 and 1771690-85-7 *, 2015.
Database Chemabs [Online] Chemical Abstracts Service, Columbus, Ohio, US; XP93094515, Database accession No. 2014:939435 * compound with CAS registry No. 1624736-04-4 *, 2014.
Database Chemabs [Online] Chemical Abstracts Service, Columbus, Ohio, US; XP93094516, Database accession No. 2013:949309 * compound with CAS registry Nos. 1462350-79-3 and 1462351-96-7 *, 2013.
Database Chemabs [Online] Chemical Abstracts Service, Columbus, Ohio, US; XP93094517, Database accession No. 2002:255501 * compound with CAS registry No. 434936-46-6 *, 2002.
Database Chemabs [Online] Chemical Abstracts Service, Columbus, Ohio, US; XP93094521, Database accession No. 1976:89825 * compound with CAS registry Nos. 58344-93-7, 58344-95-9, 58344-99-3 and 58345-00-9, 58345-02-1 *, 1976.
Extended European Search Report issued Nov. 2, 2023 in corresponding European Patent Application No. 21849355.9.
International Search Report issued Sep. 14, 2021 in International (PCT) Application No. PCT/JP2021/028307.
Kwan, Patrick et al., "Early Identification of Refractory Epilepsy", The New England Journal of Medicine, Feb. 2000, vol. 342, No. 5, pp. 314-319.
Neal, Elizabeth G. et al., "The ketogenic diet for the treatment of childhood epilepsy: a randomised controlled trial", Lancet Neurol, 2008, vol. 7, pp. 500-506.
Sada, Nagisa et al., "Targeting LDH enzymes with a stiripentol analog to treat epilepsy", Science, Mar. 2015, vol. 347, Issue No. 6228, pp. 1362-1367.
Chiron, C. et al., "Stiripentol in severe myoclonic epilepsy in infancy: a randomised placebo-controlled syndrome-dedicated trial", The Lancet, Nov. 2000, vol. 356, pp. 1638-1642.
Quilichini, Pascale P. et al., "Stiripentol, a Putative Antiepileptic Drug, Enhances the Duration of Opening of $GABA_A$-Receptor Channels", Epilepsia, 2006, vol. 47, No. 4, pp. 704-716.
Fantin, Valeria R. et al., "Attenuation of LDH-A expression uncovers a link between glycolysis, mitochondrial physiology, and tumor maintenance", Cancer Cell, Jun. 2006, vol. 9, pp. 425-434.
Xie, Han et al., "Targeting Lactate Dehydorgenase-A Inhibits Tumorigenesis and Tumor Progression in Mouse Models of Lung Cancer and Impacts Tumor-Initiating Cells", 2014, Cell Metabolism, vol. 19, pp. 795-809.
Le, Anne et al., "Inhibition of lactate dehydrogenase A induces oxidation stress and inhibits tumor progression", PNAS, Feb. 2010, vol. 107, No. 5, pp. 2037-2042.
Granchi, Carlotta et al., "Discovery of N-Hydroxyindole-Based Inhibitors of Human Lactate Dehydrogenase Isoform A (LDH-A) as Starvation Agents against Cancer Cells", Journal of Medicinal Chemistry, 2011, vol. 54, pp. 1599-1612.
Billiard, Julia et al., "Quinoline 3-sulfonamides inhibit lactate dehydrogenase A and reverse aerobic glycolysis in cancer cells", Cancer & Metabolism, 2013, vol. 1, No. 19, 17 pages.
Le Dudal, Marine et al., "Stiripentol protects against calcium oxalate nephrolithiasis and ethylene glycol poisoning", The Journal of Clinical Investigation, Jun. 2019, vol. 129, No. 6, pp. 2571-2577.
Fujiwara, Atsushi et al., "Stiripentol alleviates neuropathic pain in L5 spinal nerve-transected mice", Journal of Anesthesia, 2020, vol. 34, pp. 373-381.
Riban, V. et al., "Evolution of Hippocampal Epileptic Activity During the Development of Hippocampal Sclerosis in a Mouse Model of Temporal Lobe Epilepsy", Neuroscience, 2002, vol. 112, No. 1, pp. 101-111.
Chang, Meng-Yang et al., "NBS-mediated cyclization of trans-cinnamic alcohols", Tetrahedron, 2013, vol. 69, No. 31, pp. 6364-6370.
Koppolu, Srinivasa Rao et al., "Triflic Acid Promoted Direct α-Alkylation of Unactivated Ketones Using Benzylic Alcohols via in Situ Formed Acetals", The Journal of Organic Chemistry, 2014, vol. 79, No. 13, pp. 6069-6078.
Yuan, Zhenbo et al., "Tandem 1,6-addition/cyclization/vinylcyclopropane rearrangement at low temperature under metal-free conditions: an approach to spiro[4.5]cyclohexadienones", Chemical Communications, 2017, vol. 53, No. 24, pp. 3485-3488.
Krishna, Jonnada et al., "Sequential one-pot approach for the synthesis of functionalized phthalans via Heck-reduction-cyclization (HRC) reactions", RSC Advances, 2015, vol. 5, No. 34, 26749-26761.
Uchil, Vinod Rama et al., "Selective reductions of substituted α-(1,2,4-triazol-1-yl)chalcones with $NaBH_4$ and Al-isopropoxide: Synthesis of substituted (±)α-(4-chlorophenyl)-β-(phenylmethylene)-1H-1,2,4-triazole-1-ethanols having potential bateriostatic and agro-based fungicidal activity", Indian Journal of Chemistry, Mar. 2002, vol. 41B, No. 3, pp. 631-634.

* cited by examiner

[Figure 1]
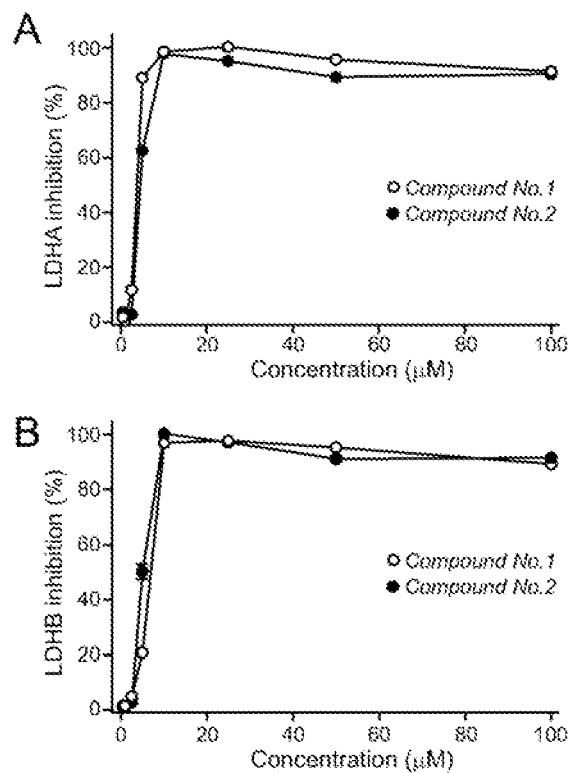
[Figure 2]
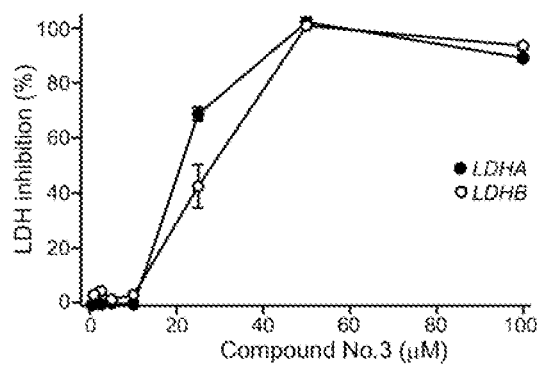

[Figure 3]
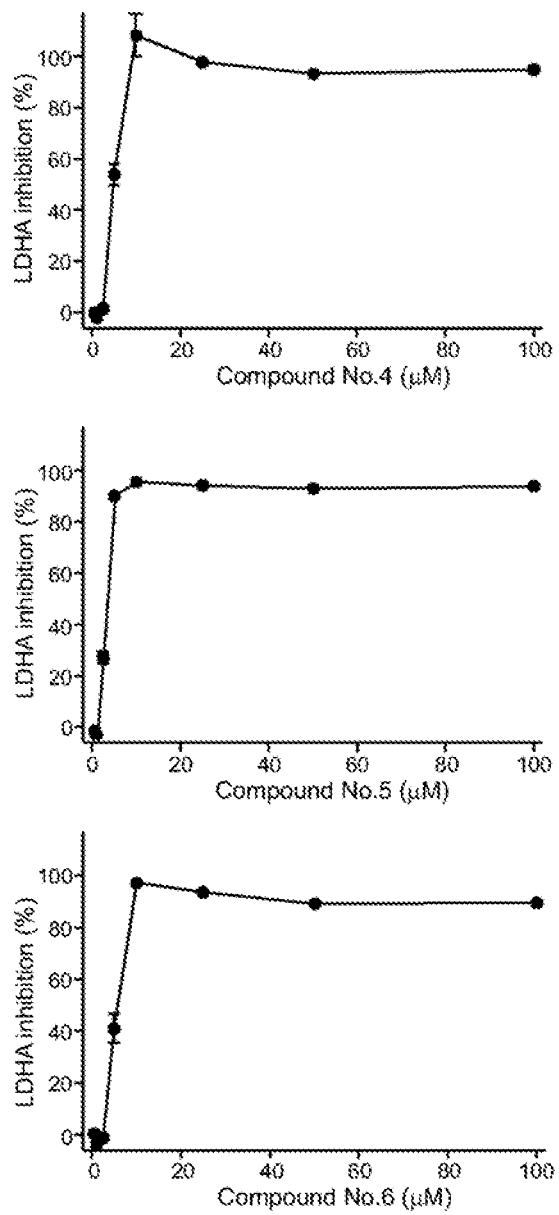

[Figure 4]
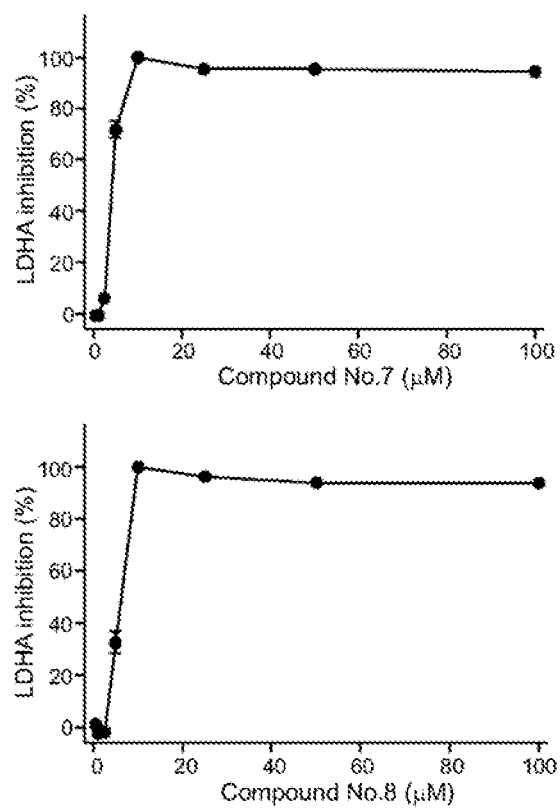

[Figure 5]
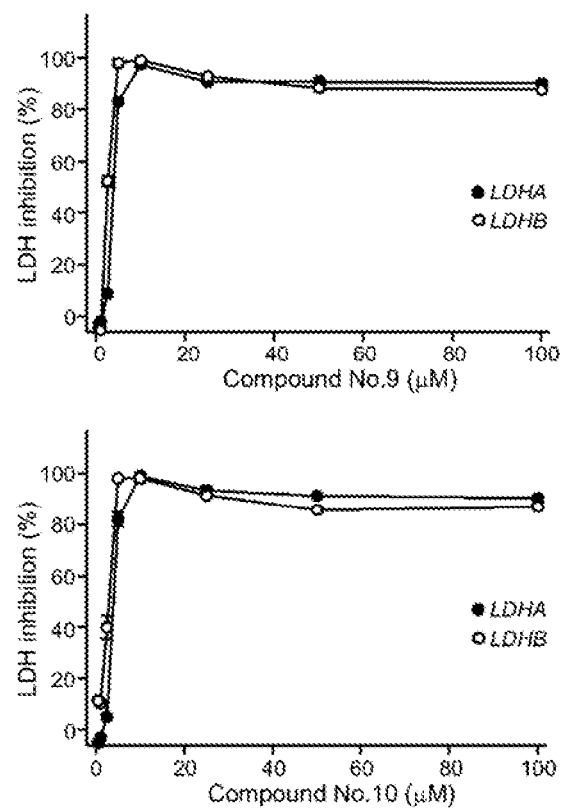

[Figure 6]
A Vehicle
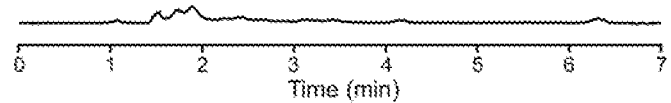
B Compound No.1 (50 mg/kg)
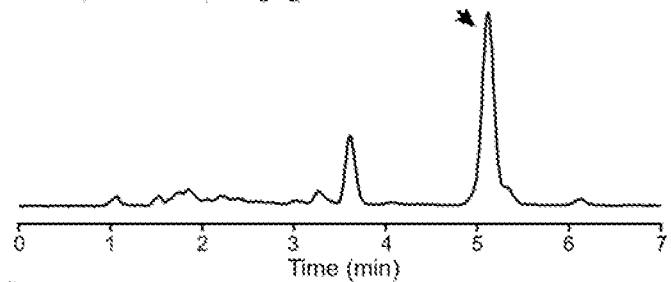
C Compound No.1 (standard)
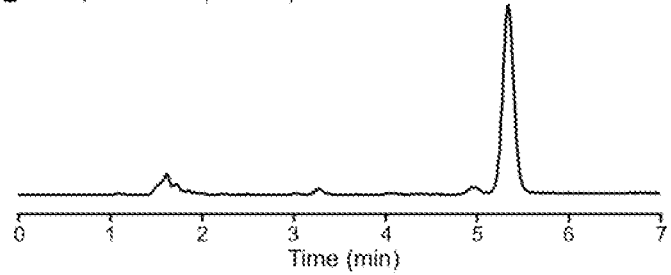

[Figure 7]
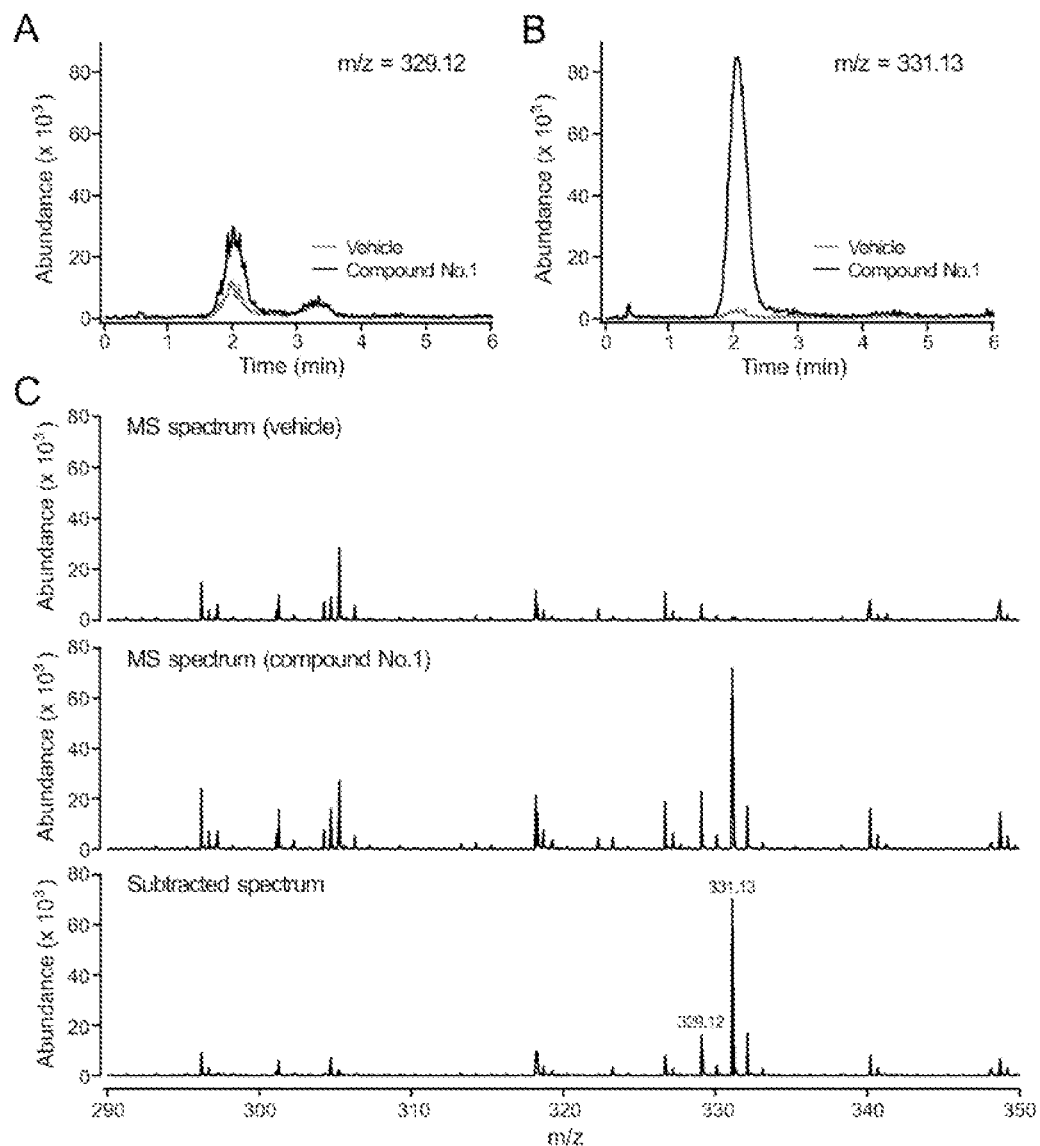

[Figure 8]
A *Vehicle*
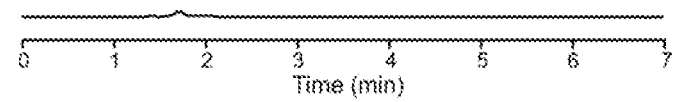
B *Compound No.2 (50 mg/kg)*
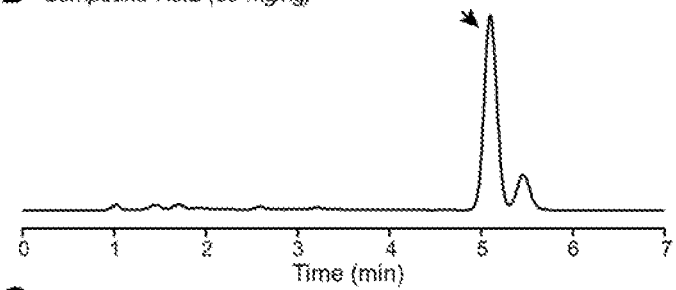
C *Compound No.2 (standard)*
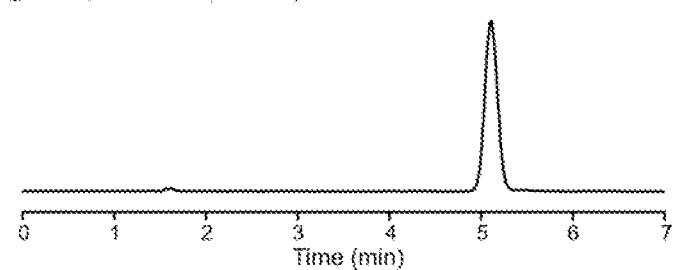

[Figure 9]
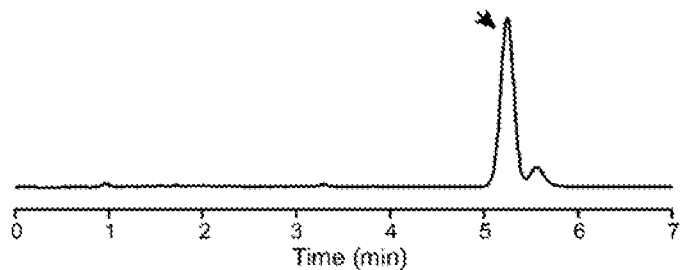
A Compound No.4 (50 mg/kg)
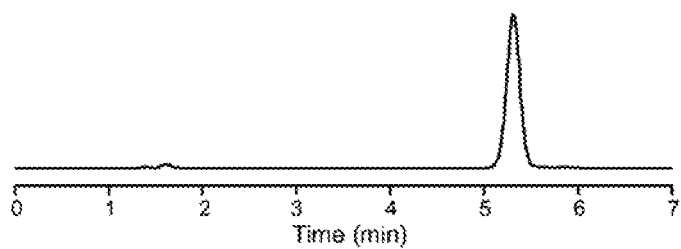
B Compound No.4 (standard)
[Figure 10]
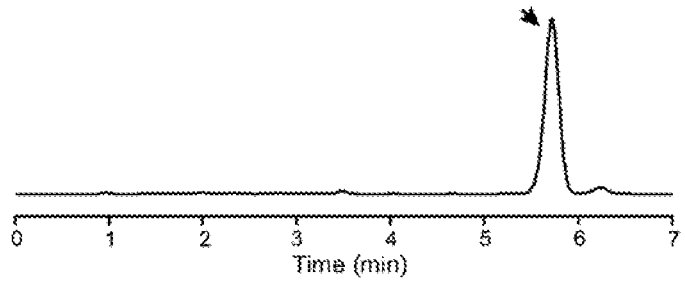
A Compound No.9 (50 mg/kg)
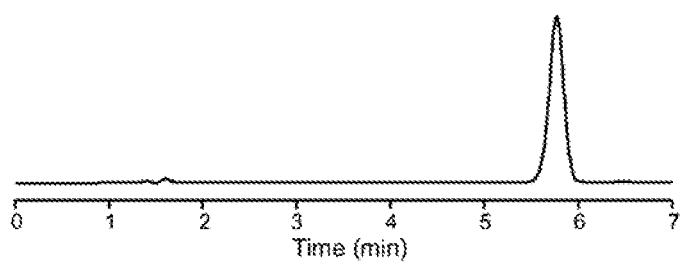
B Compound No.9 (standard)

[Figure 11]
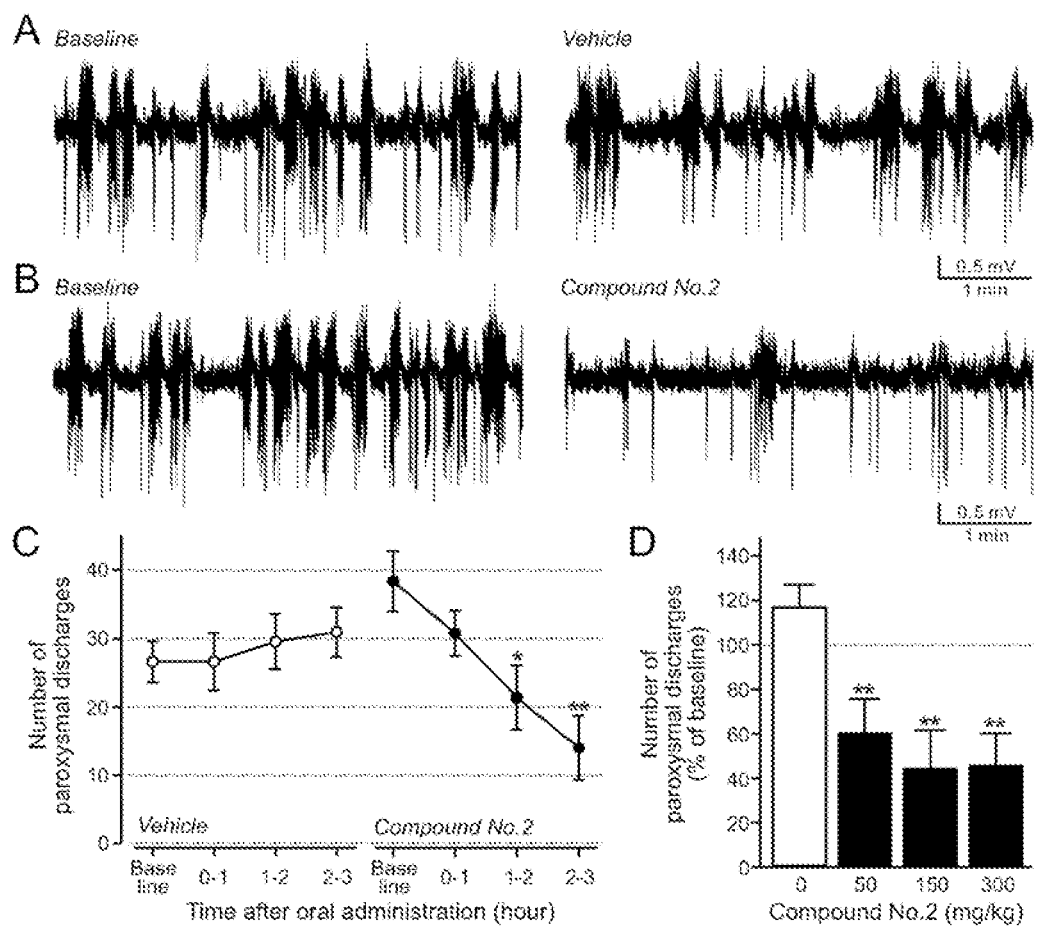

STIRIPENTOL DERIVATIVE AND USE THEREOF

TECHNICAL FIELD

The present invention relates to a novel stiripentol derivative and use thereof, more specifically, to a novel stiripentol derivative and a lactate dehydrogenase inhibitor and medicament (e.g., antiepileptic agent, anti-cancer agent) containing the derivative as an active ingredient.

BACKGROUND ART

Epilepsy is a neurological disease characterized by hyperexcitability of brain electrical activity. Because of this, existing epilepsy therapeutic drugs have been designed/produced such that they act on molecules which control brain electrical activity (e.g., ion channel, synaptic receptor). However, these existing drugs are ineffective for about 30% of the patients (Non-Patent Literature 1).

Interestingly, for treating intractable epilepsy, a diet therapy called "ketogenic diet" is effective (Non-Patent Literature 2). However, the diet therapy imposes strict dietary restrictions. For the reason, development of a "therapeutic drug based on the action mechanism of ketogenic diet" has been strongly desired. In the circumstances, recently, it has been found that a metabolic enzyme, "lactate dehydrogenase" (LDH) plays a role of a molecule having the action mechanism of the ketogenic diet (Non-Patent Literature 3). That is, a "lactate dehydrogenase inhibitor" (herein, sometimes referred to as "LDH inhibitor") is expected as a novel drug having a completely different mechanism of action from those of existing drugs (electrical controlling molecules).

In development toward the novel drug, it was reported that an existing antiepileptic agent, "stiripentol" (see, the following formula (I)) has an inhibitory action against lactate dehydrogenase (Non-Patent Literature 3). In recent years, stiripentol has been clinically used as a therapeutic drug for Dravet syndrome (high-mortality pediatric epilepsy) (Non-Patent Literature 4). However, stiripentol has a problem. Since stiripentol is basically designed/produced to act on the GABA system of the brain (Non-Patent Literature 5), the inhibitory action against lactate dehydrogenase is weak. Then, if lactate dehydrogenase inhibitory action is enhanced by modifying the chemical structure of stiripentol, theoretically, a novel drug can be developed.

[Formula 1]

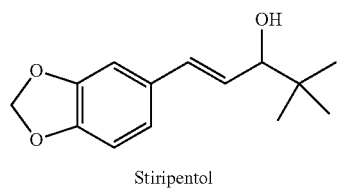

Stiripentol

In the circumstances, many lactate dehydrogenase inhibitors of stiripentol modified in chemical structure have been reported (Patent Literature 1). In the prior invention, it was identified that many lactate dehydrogenase inhibitors are successfully produced by using a substructure (isosafrole structure) of stiripentol as a scaffold. These stiripentol derivatives (for example, see the following formula (II) wherein $R^g$ represents any substituent) have a remarkable lactate dehydrogenase inhibitory action stronger than stiripentol and isosafrole.

[Formula 2]

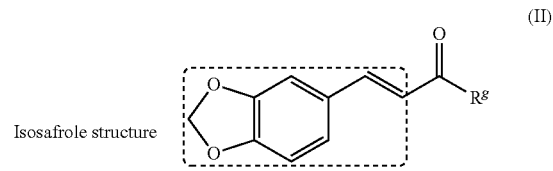

Example of stiripentol derivative disclosed in Patent Literature 1

Lactate dehydrogenase is also known as a "target molecule for developing a cancer drug" (Non-Patent Literatures 6 and 7). If lactate dehydrogenase is inhibited, "Warburg effect", which is the energy metabolism characteristic in cancer (cancer metabolism), is produced, with the result that an anticancer effect is obtained. Since it is expected that an anticancer drug based on the Warburg effect is effective also for "intractable cancer" such as pancreatic cancer, many lactate dehydrogenase inhibitors have been proposed up to present (Non-Patent Literatures 8 to 10). It is also reported that stiripentol has an anticancer effect (Patent Literature 2).

Further, in recent years, it has been reported that stiripentol is also effective for a plurality of diseases (calcium oxalate calculosis, neuropathic pain) (Non-Patent Literatures 11 and 12).

CITATION LIST

Patent Literatures

Patent Literature 1: WO2016/129583 (JP 6681072 B, U.S. Ser. No. 10/350,192 B)
Patent Literature 2: WO2014/115764 (JP 6194322 B) Non-Patent Literatures
Non-Patent Literature 1: Kwan and Brodie, *N Engl J Med* 342: 314-319, 2000
Non-Patent Literature 2: Neal et al, *Lancet Neurol* 7: 500-506, 2008
Non-Patent Literature 3: Sada et al, *Science* 347: 1362-1367, 2015
Non-Patent Literature 4: Chiron et al, *Lancet* 356: 1638-1642, 2000
Non-Patent Literature 5: Quilichini et al, *Epilepsia* 47: 704-716, 2006
Non-Patent Literature 6: Fantin et al, *Cancer Cell* 9: 425-434, 2006
Non-Patent Literature 7: Xie et al, *Cell Metab* 19: 795-809, 2014
Non-Patent Literature 8: Le et al, *Proc Natl Acad Sci USA* 107: 2037-2042, 2010
Non-Patent Literature 9: Granchi et al, *J Med Chem* 54: 1599-1612, 2011
Non-Patent Literature 10: Billiard et al, *Cancer Metab* 1: 1-19, 2013
Non-Patent Literature 11: Le Dudal et al, *J Clin Invest* 129: 2571-2577, 2019
Non-Patent Literature 12: Fujiwara et al, *J Anesth* 34: 373-381, 2020
Non-Patent Literature 13: Riban et al, *Neuroscience* 112: 101-111, 2002

SUMMARY OF INVENTION

Technical Problem

The structure of stiripentol is unique as the structure of a lactate dehydrogenase inhibitor. In addition, the many stiripentol derivatives reported in the prior invention (Patent Literature 1) have a strong lactate dehydrogenase inhibitory action compared to stiripentol. Although it is expected that these stiripentol derivatives are effective for a plurality of diseases such as intractable epilepsy and intractable cancer (as they are), there may still remain room for improvement in developing therapeutic drugs excellent in in-vivo activity. For example, for therapeutic drugs to be orally administered, it is extremely important for the drugs to have metabolic stability in the blood. If the metabolic stability is low, an unchanged form of a drug orally taken quickly disappears in the body. Because of this, a sufficient medicinal effect cannot be obtained. If a stiripentol derivative having higher metabolic stability than existing ones, it is expected that development of a therapeutic drug having more excellent in-vivo activity greatly proceeds.

An object of the present invention is to provide a novel compound that can be used as a lactate dehydrogenase inhibitor or an active ingredient of a medicament such as an antiepileptic agent and an anti-cancer agent, and particularly, to provide a novel compound having excellent metabolic stability.

Solution to Problem

The present inventors focused on stiripentol derivatives reported by the prior invention (Patent Literature 1), particularly on compounds (derivatives) exhibiting a strong lactate dehydrogenase inhibitory action (Patent Literature 1, compounds 1, 3 to 6, 9 and 11 of FIG. 6, which are comprehensively represented by the following formula (III) herein. In formula (III), R represents any substituent). Of them, a stiripentol derivative having a biphenyl structure (Patent Literature 1, compound 9 of FIG. 6, which is represented by the following formula (IV), herein), is reported to have the strongest lactate dehydrogenase inhibitory activity.

[Formula 3]

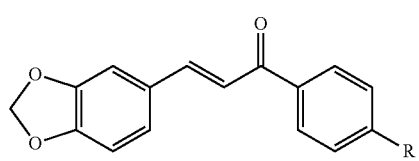

Preferred stiripentol derivative disclosed in Patent Literature 1

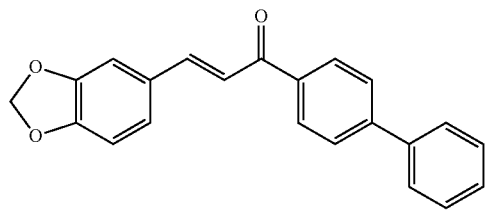

The present inventor found that, among stiripentol derivatives disclosed in the prior invention (Patent Literature 1), a preferable compound represented by formula (III); for example, a compound obtained by substituting a carbonyl group of a compound represented by formula (IV) with a hydroxy group, more specifically, a compound represented by the following formula (1A), a compound having substituents $R^a$ to $R^d$ further introduced therein and represented by the following formula (1B), such as compounds Nos. 1 to 10 (including the novel stiripentol derivatives according to the present invention) shown in Examples (Table 1), maintain a strong lactate dehydrogenase inhibitory activity. They further found that the above stiripentol derivatives according to the prior invention are easily metabolized in vivo and likely to disappear from the blood, whereas, a novel stiripentol derivative according to the present invention exhibits high metabolic stability in vivo; and that a novel stiripentol derivative according to the present invention orally administered (through clinical administration route) exhibits a remarkable anti-epilepsy action, in a model mouse having intractable epilepsy (temporal lobe epilepsy with hippocampal sclerosis) resistant to existing drugs. Since the compounds mentioned above maintain a strong lactate dehydrogenase inhibitory activity, and have high metabolic stability and in vivo pharmacological action, a compound prepared by replacing R with another type of ring structure or another substituent in a compound represented by formula (1A) or formula (1B) and a compound prepared by introducing a substituent into a site except R, in short, compounds represented by the following formula (1), would be expected to exhibit the same properties as above. In addition, the same expectation can apply to the compounds represented by the formula (1') later described. Based on these findings, the present invention was accomplished.

[Formula 4]

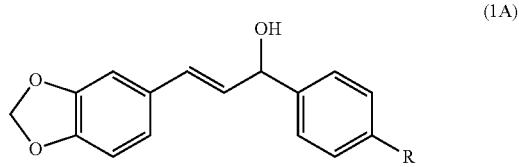

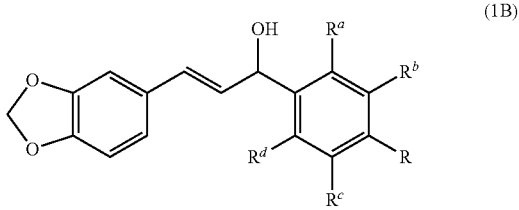

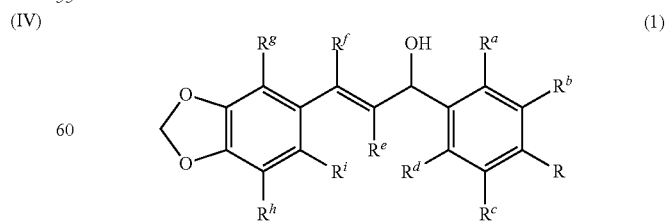

More specifically, according to an aspect of the present invention, the following inventions are provided.

[1]
A compound represented by the following formula (1):

[Formula 5]

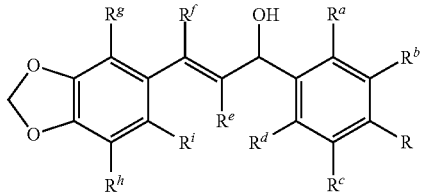

(1)

wherein R represents any substituent; and $R^a$, $R^b$, $R^c$, $R^d$, $R^e$, $R^f$, $R^g$, $R^h$ and $R^i$ each represent a hydrogen atom (unsubstituted) or any substituent.

[2]
The compound according to item 1, in which R is a monovalent substituent of an aromatic or non-aromatic 3 to 14-membered ring which may be unsubstituted or substituted and monocyclic or polycyclic.

[3]
The compound according to item 2, in which R is a phenyl group, a pyridyl group, a thienyl group, a cyclopentenyl group or a cyclohexenyl group that may be unsubstituted or substituted.

[4]
The compound according to any one of items 1 to 3, in which $R^e$, $R^f$, $R^g$, $R^h$ and $R^i$ are all hydrogen atoms (unsubstituted).

[5]
The compound according to item 4, in which $R^a$, $R^b$, $R^c$ and $R^d$ are also all hydrogen atoms (unsubstituted)

[6]
The compound according to item 4, in which at least one of $R^a$, $R^b$, $R^c$ and $R^d$ is any substituent.

[7]
A salt or solvate of the compound according to any one of items 1 to 6.

[8]
A lactate dehydrogenase inhibitor containing the compound according to any one of items 1 to 7, a salt or solvate thereof.

[9]
A medicament containing the compound according to any one of items 1 to 7, a salt or solvate thereof, as an active ingredient.

[10]
The medicament according to item 9, as an antiepileptic agent or an anti-cancer agent.

Note that, those skilled in the art can modify the inventions according to a compound, a lactate dehydrogenase inhibitor and a medicament (for example, an antiepileptic agent and anti-cancer agent) mentioned above so as to belong to another category, based on the technical idea of the present invention and the description of the specification. According to another aspect of the present invention, there are provided, e.g., an invention directed to "a compound according to any one of items 1 to 7, a salt or solvate thereof, for inhibiting lactate dehydrogenase (as a lactate dehydrogenase inhibitor) or serving as an active ingredient of a medicament"; an invention directed to "use of a compound according to any one of items 1 to 7, a salt or solvate thereof, for inhibiting lactate dehydrogenase (as a lactate dehydrogenase inhibitor) or use thereof as an active ingredient of a medicament"; and an invention directed to "a method for treating a disease (for example, epilepsy, cancer), comprising administering an effective amount of a compound according to any one of items 1 to 7, a salt or solvate thereof".

Advantageous Effects of Invention

The present invention provides a novel compound having the same potent lactate dehydrogenase inhibitory activity as the stiripentol derivative disclosed in the prior invention (Patent Literature 1), and preferably, a novel compound further improved in metabolic stability. The present invention provides a more excellent antiepileptic agent and anti-cancer agent and medicaments other than these using such a novel compound as an active ingredient.

BRIEF DESCRIPTION OF DRAWINGS

FIG. 1 Inhibitory activities (see, Examples) of the compound No. 1 (a compound of formula (IV) as the prior art) and Compound No. 2 (a compound of formula (3A-1) according to the present invention) against enzymatic activities of lactate dehydrogenases (LDH1, LDH5). A: inhibitory activities of the compound No. 1 (open circle) and Compound No. 2 (filled circle) against LDH5 (tetramer of LDHA). B: inhibitory activities of the compound No. 1 (open circle) and Compound No. 2 (filled circle) against LDH1 (tetramer of LDHB). The vertical axis of the graph represents inhibition rate. The rate of 100% indicates that lactate dehydrogenase is completely inhibited (the same applies to FIGS. 2 to 5).

FIG. 2 Inhibitory activity (see, Examples) of Compound No. 3 (a compound of formula (4A-1) according to the present invention) against enzymatic activity of lactate dehydrogenase (LDH1, LDH5). A filled circle shows inhibitory activity against LDH5 (tetramer of LDHA) and an open circle shows inhibitory activity against LDH1 (tetramer of LDHB).

FIG. 3 Inhibitory activities (see, Examples) of Compound No. 4 (a compound of formula (3A-2) according to the present invention), Compound No. 5 (a compound of formula (3A-3) according to the present invention) and Compound No. 6 (a compound of formula (5A-1) according to the present invention) against enzymatic activity of lactate dehydrogenase (LDH5=tetramer of LDHA).

FIG. 4 Inhibitory activities (see, Examples) of Compound No. 7 (a compound of formula (6A-1) according to the present invention) and Compound No. 8 (a compound of formula (7A-1) according to the present invention) against enzymatic activity of lactate dehydrogenase (LDH5=tetramer of LDHA).

FIG. 5 Inhibitory activities (see, Examples) of Compound No. 9 (a compound of formula (3B-1) according to the present invention) and Compound No. 10 (a compound of formula (3B-2) according to the present invention) against enzymatic activity of lactate dehydrogenase (LDH1, LDH5). A filled circle shows inhibitory activity against LDH5 (tetramer of LDHA) and an open circle shows inhibitory activity against LDH1 (tetramer of LDHB).

FIG. 6 HPLC analysis (see, Examples) of blood plasma constituents when the compound No. 1 was orally administered to a mouse. A: HPLC trace for blood plasma constituents when a vehicle (alone) was orally administered. B: HPLC trace for blood plasma constituents when the compound No. 1 (50 mg/kg) was orally administered. The compound No. 1 was orally administered by use of a vehicle. C: HPLC trace for the compound No. 1 as a standard substance. The HPLC retention time of a peak (B, pointed by arrow) derived from the orally administered compound No. 1 in the blood plasma slightly shifts from that of a peak (C) of the compound No. 1 as a standard substance.

FIG. 7 MS analysis (see, Examples) of blood plasma constituents when the compound No. 1 was orally administered to a mouse. A: extracted ion chromatogram (EIC) trace (m/z=329.12±0.1) for blood plasma constituents when each of a vehicle (gray) and the compound No. 1 (50 mg/kg, black) was orally administered. Accurate mass of a protonated molecule of the compound No. 1 is 329.12. B: EIC trace (m/z=331.13±0.1) for blood plasma constituents when each of a vehicle (gray) and the compound No. 1 (50 mg/kg, black) was orally administered. C: Spectra observed in the peaks (1.9-2.1 min) of EIC of blood plasma constituents; MS spectrum (upper stage) observed when a vehicle was administered, MS spectrum (middle stage) observed when the compound No. 1 was administered, and their subtracted spectrum (lower stage). In the subtracted spectrum, a peak (m/z=329.12) showing an unchanged compound is observed and a significantly larger peak (m/z=331.13) showing a metabolite is also observed.

FIG. 8 HPLC analysis (see, Examples) of blood plasma constituents when Compound No. 2 was orally administered to a mouse. A: HPLC trace for blood plasma constituents when a vehicle (alone) was orally administered. B: HPLC trace for blood plasma constituents when Compound No. 2 was orally administered (50 mg/kg). Compound No. 2 was orally administered by use of a vehicle. C: HPLC trace for Compound No. 2 as a standard substance. The retention time of a peak (B, pointed by arrow) derived from the orally administered Compound No. 2 in the blood plasma is completely consistent with that of a peak (C) of Compound No. 2 as a standard substance.

FIG. 9 HPLC analysis (see, Examples) of blood plasma constituents when Compound No. 4 was orally administered to a mouse. A: HPLC trace for blood plasma constituents when Compound No. 4 (50 mg/kg) was orally administered. Compound No. 4 was orally administered by use of a vehicle. B: HPLC trace for Compound No. 4 as a standard substance. The HPLC retention time of a peak (A, pointed by arrow) derived from the orally administered Compound No. 4 in the blood plasma is completely consistent with that of a peak (B) of Compound No. 4 as a standard substance.

FIG. 10 HPLC analysis (see, Examples) of blood plasma constituents when Compound No. 9 was orally administered to a mouse. A: HPLC trace for blood plasma constituents when Compound No. 9 (50 mg/kg) was orally administered. Compound No. 9 was orally administered by use of a vehicle. B: HPLC trace for Compound No. 9 as a standard substance. The HPLC retention time of a peak (A, pointed by arrow) derived from the orally administered Compound No. 9 in the blood plasma is completely consistent with that of a peak (B) of Compound No. 9 as a standard substance.

FIG. 11 Anti-epileptic action (see, Examples) of Compound No. 2 against epileptic seizure in a hippocampal sclerosis model mouse. A: action of a vehicle against epileptic seizures. Epileptic seizures in the hippocampus before administration (Baseline) and 2.5 hours after administration (Vehicle) are shown. B: action of Compound No. 2 (150 mg/kg) against epileptic seizures. Epileptic seizures in the hippocampus before administration (Baseline) and 2.5 hours after administration (Compound No. 2) are shown. C: summary data of actions of the vehicle and Compound No. 2 on the number of spontaneous epileptic seizures. The number of epileptic seizures observed per hour was counted. Statistical analysis was carried out based on one-way repeated measures ANOVA and Dunnett's test. A significant difference was evaluated based on the number of epileptic seizures before administration (Baseline) (*P<0.05, P<0.01). D: dose dependence of Compound No. 2 on epileptic seizure suppression action. The vertical axis of the graph shows the change rate (%) of the number of epileptic seizures 2-3 hours after administration relative to that of one hour before administration (Baseline). Statistical analysis was carried out based on one-way repeated measures ANOVA and Dunnett's test. A significant difference was evaluated based on the vehicle (0 mg/kg) (P<0.01).

DESCRIPTION OF EMBODIMENTS

In the specification, a "compound represented by formula (N)" (N represents any one of, e.g., 1 to 7, 1A to 7A, 1B to 7B, 1' and 1'A) is sometimes referred to as a "compound (N)". In the specification, "compound or a salt thereof, or a solvate thereof" is sometimes referred to as a "compound or the like"; and a "compound represented by formula (N) or a salt thereof, or a solvate thereof" is sometimes referred to as a "compound (N) or the like".

The "compound represented by formula (N)", i.e., "compound (N)", sometimes includes a stereoisomer, more specifically, an enantiomer and/or a diastereomer (stereoisomer except an enantiomer). Such diastereomer includes, for example, a cis-trans isomer with respect to any one of ring structures contained in a compound (N) and a cis-trans isomer (E/Z-form) with respect to any one of double bonds. In the present invention, as long as a predetermined effect is exerted, a mixture of stereoisomers (for example, a racemate as a mixture of enantiomers) and a purified product increased in content of a predetermined stereoisomer up to, for example, 90% or more, preferably 95% or more, and more preferably 99% or more, may be used as the compound (N). Ideally, a purified product substantially consisting only of the stereoisomer, may be used. More specifically, for example, in the case where dashed line-cuneiform mark or the like is not used in formula (N) and in the case where RS notation, cis-transformer notation and E-Z notation are not attached to the name of a compound of formula (N) or the name of the substituent to be introduced into formula (N), all (any) stereoisomers can be represented by "compound (N)" herein, unless otherwise specified.

—Compound—

The compound of the present invention (a novel stiripentol derivative) is a compound represented by the following formula (1), more specifically, referred to as Compound (1).

[Formula 6]

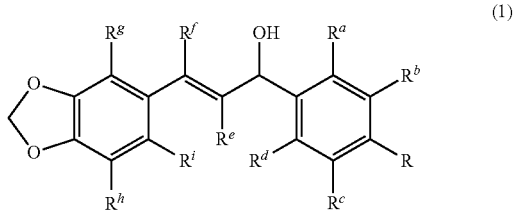

(1)

In formula (1), R represents any substituent; $R^a$, $R^b$, $R^c$, $R^d$, $R^e$, $R^f$, $R^g$, $R^h$ and $R^i$ each represent a hydrogen atom (unsubstituted) or any substituent. Each of R, $R^a$, $R^b$, $R^c$, $R^d$, $R^e$, $R^f$, $R^g$, $R^h$ and $R^i$ is not particularly limited as long as Compound (1) has a lactate dehydrogenase inhibitory activity, and preferably, a further improved metabolic stability. Which substituent is selected as R and which substituents are selected as $R^a$, $R^b$, $R^c$, $R^d$, $R^e$, $R^f$, $R^g$, $R^h$ and $R^i$, or whether substituents are not employed, can be appropriately determined in consideration of, e.g., a desired lactate dehydrogenase inhibitory activity, metabolic stability and other properties (for example, solubility to water). Those skilled in the art can design and produce Compound (1) exerting the effect of the present invention and to be successfully used for carrying out the present invention, without excessive trial and error.

Note that, the "lactate dehydrogenase inhibitory activity" and "metabolic stability" and other properties can be individually determined or evaluated in accordance with routine methods, for example, methods described later in Examples. The phrase "having improved metabolic stability" means that the Compound (1) of the present invention has a higher metabolic stability than an existing stiripentol derivative (having the same substituents as the Compound (1) of the present invention except that a carbonyl group is used in place of a hydroxy group) disclosed in Patent Literature 1.

Examples of substituents represented by R include those belonging to substituent group 1, substituent group 2 or substituent group 3 shown below. If a substituent (particularly, substituent containing a ring structure that may be further substituted or a substituent containing a double bond) has stereoisomers, all (any) stereoisomers can be referred to as the substituent, unless otherwise specified.

[Substituent Group 1]
  [X] halogen atom
  [O1] hydroxy group
  [O2] oxo group
  [S1] sulfanyl group (thiol group)
  [S2] sulfo group
  [N1] amino group
  [N2] imino group
  [N3] nitro group
  [C1] formyl group
  [C2] carboxy group
  [C3] thiocarboxy group
  [C4] carbamoyl group
  [C5] thiocarbamoyl group
  [C6] cyano group
[Substituent Group 2]
  [A1] $C_{1-6}$ alkyl group that may be substituted
  [A2] $C_{2-6}$ alkenyl group
  [A3] $C_{2-6}$ alkynyl group
  [A4] $C_{3-10}$ cycloalkyl group
  [A5] $C_{3-10}$ cycloalkenyl group
  [A6] $C_{6-14}$ aryl group that may be substituted
  [A7] $C_{7-16}$ aralkyl group
  [H1] 5 to 14-membered aromatic heterocyclic group that may be substituted
  [H2] 3 to 14-membered non-aromatic heterocyclic group that may be substituted
[Substituent Group 3]
  <—OR>
  [O11a] $C_{1-6}$ alkoxy group that may be halogenated
  [O11b] $C_{6-14}$ aryloxy group (e.g., phenoxy, naphthoxy)
  [O11c] $C_{7-16}$ aralkyloxy group (e.g., benzyloxy)
  [O11d] 5 to 14-membered aromatic heterocyclic oxy group (e.g., pyridyloxy)
  [O11e] 3 to 14-membered non-aromatic heterocyclic oxy group (e.g., morpholinyloxy, piperidinyloxy)
  <—O—CO—R>
  [O12a] $C_{1-6}$ alkyl-carbonyloxy group (e.g., acetoxy, propanoyloxy)
  [O12b] $C_{6-14}$ aryl-carbonyloxy group (e.g., benzoyloxy, 1-naphthoyloxy, 2-naphthoyloxy)
  [O12c] 5 to 14-membered aromatic heterocyclic carbonyloxy group (e.g., nicotinoyloxy)
  [O12d] 3 to 14-membered non-aromatic heterocyclic carbonyloxy group (e.g., morpholinylcarbonyloxy, piperidinylcarbonyloxy)
  [O12e] $C_{1-6}$ alkoxy-carbonyloxy group (e.g., methoxycarbonyloxy, ethoxycarbonyloxy, propoxycarbonyloxy, butoxycarbonyloxy)
  <—O—CO—NRR'>
  [O13a] mono- or di-$C_{1-6}$ alkyl-carbamoyloxy group (e.g., methylcarbamoyloxy, ethylcarbamoyloxy, dimethylcarbamoyloxy, diethylcarbamoyloxy)
  [O13b] $C_{6-14}$ aryl-carbamoyloxy group (e.g., phenylcarbamoyloxy, naphthylcarbamoyloxy)
  <—O—$SO_2$—R>
  [O14a] $C_{1-6}$ alkylsulfonyloxy group that may be halogenated (e.g., methylsulfonyloxy, trifluoromethylsulfonyloxy)
  [O14b] $C_{6-14}$ arylsulfonyloxy group that may be substituted with $C_{1-6}$ alkyl group (e.g., phenylsulfonyloxy, toluenesulfonyloxy)
  <—SR>
  [S11] $C_{1-6}$ alkylthio group that may be halogenated
  <—$SO_2$—R>
  [S21a] $C_{1-6}$ alkylsulfonyl group that may be halogenated
  [S21b] $C_{6-14}$ arylsulfonyl group
  [S21c] 5 to 14-membered aromatic heterocyclic sulfonyl group (e.g., pyridylsulfonyl, thienylsulfonyl)
  <—SO—R>
  [S22a] $C_{1-6}$ alkylsulfinyl group that may be halogenated
  [S22b] $C_{6-14}$ arylsulfinyl group (e.g., phenylsulfinyl, 1-naphthylsulfinyl, 2-naphthylsulfinyl)
  [S22c] 5 to 14-membered aromatic heterocyclic sulfinyl group (e.g., pyridylsulfinyl, thienylsulfinyl)
  <—NRR'>
  [N11a] mono- or di-$C_{1-6}$ alkylamino group (e.g., methylamino, ethylamino, propylamino, isopropylamino, butylamino, dimethylamino, diethylamino, dipropylamino, dibutylamino, N-ethyl-N-methylamino)
  [N11b] mono- or di-$C_{6-14}$ arylamino group (e.g., phenylamino)
  [N11c] 5 to 14-membered aromatic heterocyclic amino group (e.g., pyridylamino)
  [N11d] $C_{7-16}$ aralkylamino group (e.g., benzylamino)
  <—NH—C(O)H/—NH—C(O)R>
  [N12a] formylamino group
  [N12b] $C_{1-6}$ alkyl-carbonylamino group (e.g., acetylamino, propanoyl amino, butanoylamino)
  [N12c] ($C_{1-6}$ alkyl) ($C_{1-6}$ alkyl-carbonyl) amino group (e.g., N-acetyl-N-methylamino)
  [N12d] $C_{6-14}$ aryl-carbonylamino group (e.g., phenylcarbonylamino, naphthylcarbonylamino)
  [N12e] $C_{1-6}$ alkoxy-carbonylamino group (e.g., methoxycarbonylamino, ethoxycarbonylamino, propoxycarbonylamino, butoxycarbonylamino, tert-butoxycarbonylamino)
  [N12f] $C_{7-16}$ aralkyloxy-carbonylamino group (e.g., benzyloxycarbonylamino)
  <—NH—$S(O)_2$R>
  [N13a] $C_{1-6}$ alkylsulfonylamino group (e.g., methylsulfonylamino, ethylsulfonylamino)

[N13b] $C_{6-14}$ arylsulfonylamino group that may be substituted with $C_{1-6}$ alkyl group (e.g., phenylsulfonylamino, toluenesulfonylamino)

<—C(O)R>

[C11a] $C_{1-6}$ alkyl-carbonyl group that may be halogenated
[C11b] $C_{6-14}$ aryl-carbonyl group
[C11c] 5 to 14-membered aromatic heterocyclic carbonyl group
[C11d] 3 to 14-membered non-aromatic heterocyclic carbonyl group

<—COO—R>

[C21a] $C_{1-6}$ alkoxy-carbonyl group
[C21b] $C_{6-14}$ aryloxy-carbonyl group (e.g., phenyloxycarbonyl, 1-naphthyloxycarbonyl, 2-naphthyloxycarbonyl)
[C21c] $C_{7-16}$ aralkyloxy-carbonyl group (e.g., benzyloxycarbonyl, phenethyloxycarbonyl)

<—CO—NRR'>

[C41a] mono- or di-$C_{1-6}$ alkyl-carbamoyl group
[C41b] $C_{6-14}$ aryl-carbamoyl group (e.g., phenylcarbamoyl)
[C41c] 5 to 14-membered aromatic heterocyclic carbamoyl group (e.g., pyridylcarbamoyl, thienylcarbamoyl)
[C41d] 3 to 14-membered non-aromatic heterocyclic carbamoyl group (e.g., morpholinylcarbamoyl, piperidinyl carbamoyl)

The "halogen atom" represented by, e.g., [X], refers to a fluorine atom, a chlorine atom, a bromine atom or an iodine atom.

A "$C_{1-6}$ alkyl group" represented by, e.g., [A1], refers to a linear or branched saturated hydrocarbon group having 1 to 6 carbon atoms. Examples of the "$C_{1-6}$ alkyl group" include methyl, ethyl, propyl, isopropyl, butyl, isobutyl, sec-butyl, tert-butyl, pentyl, isopentyl, neopentyl, 1-ethyl propyl, hexyl, isohexyl, 1,1-dimethylbutyl, 2,2-dimethylbutyl, 3,3-dimethylbutyl and 2-ethylbutyl groups. In an embodiment, the "$C_{1-6}$ alkyl group" represented by, e.g., [A1], is preferably a "$C_{1-4}$ alkyl group", and more preferably, a "$C_{1-2}$ alkyl group".

Examples of the substituent that the $C_{1-6}$ alkyl group represented by, e.g., [A1], may have include those belonging to substituent group 1, e.g., a halogen atom, an amino group and a carboxy group.

A "$C_{1-6}$ alkyl group" having a halogen atom as a substituent, in other word, a "halogenated" $C_{1-6}$ alkyl group, refers to a $C_{1-6}$ alkyl group in which one or more (for example 1 to 7, preferably 1 to 5) hydrogen atoms are substituted with halogen atom(s), and is sometimes referred to as a "$C_{1-6}$ haloalkyl group". Examples of the $C_{1-6}$ haloalkyl group include trifluoromethyl, 2-chloroethyl, 2-bromoethyl, 2-iodoethyl, 2-fluoroethyl, 2,2-difluoroethyl, 2,2,2-trifluoroethyl, pentafluoroethyl, 2,2,3,3-tetrafluoropropyl, 3,3,3-trifluoropropyl, 4,4,4-trifluorobutyl, 5,5,5-trifluoropentyl and 6,6,6-trifluorohexyl groups.

A "$C_{2-6}$ alkenyl group" represented by, e.g., [A2], refers to a linear or branched hydrocarbon group having 2 to 6 carbon atoms and a single carbon-carbon double bond. Examples of the $C_{2-6}$ alkenyl group include ethenyl, 1-propenyl, 2-propenyl, 2-methyl-1-propenyl, 1-butenyl, 2-butenyl, 3-butenyl, 3-methyl-2-butenyl, 1-pentenyl, 2-pentenyl, 3-pentenyl, 4-pentenyl, 4-methyl-3-pentenyl, 1-hexenyl, 3-hexenyl and 5-hexenyl groups. In an embodiment, the "$C_{2-6}$ alkenyl group" represented by, e.g., [A2], is preferably a "$C_{2-4}$ alkenyl group".

A "$C_{2-6}$ alkynyl group" represented by, e.g., [A3], refers to a linear or branched hydrocarbon group having 2 to 6 carbon atoms and a single carbon-carbon triple bond. Examples of the $C_{2-6}$ alkynyl group include ethynyl, 1-propynyl, 2-propynyl, 1-butynyl, 2-butynyl, 3-butynyl, 1-pentynyl, 2-pentynyl, 3-pentynyl, 4-pentynyl, 1-hexynyl, 2-hexynyl, 3-hexynyl, 4-hexynyl, 5-hexynyl and 4-methyl-2-pentynyl groups. In an embodiment, the "$C_{2-6}$ alkynyl group" represented by, e.g., [A3], is preferably a "C2-4 alkynyl group".

A "$C_{3-10}$ cycloalkyl group" represented by, e.g., [A4], refers to a monocyclic or polycyclic saturated hydrocarbon group having 3 to 10 carbon atoms. Examples of the $C_{3-10}$ cycloalkyl group include cyclopropyl, cyclobutyl, cyclopentyl, cyclohexyl, cycloheptyl, cyclooctyl, bicyclo[2.2.1]heptyl, bicyclo[2.2.2]octyl, bicyclo[3.2.1]octyl and adamantyl groups.

A "$C_{3-10}$ cycloalkenyl group" represented by, e.g., [A5], refers to a monocyclic or polycyclic hydrocarbon group having 3 to 10 carbon atoms and a single unsaturated bond. Examples of the $C_{3-10}$ cycloalkenyl group include cyclopropenyl, cyclobutenyl, cyclopentenyl, cyclohexenyl, cycloheptenyl and cyclooctenyl groups.

A "$C_{6-14}$ aryl group" represented by, e.g., [A6], refers to a monocyclic or polycyclic aromatic hydrocarbon group having 6 to 14 (preferably 6 to 10) carbon atoms. Examples of the $C_{6-14}$ aryl group include phenyl, naphthyl (e.g., 1-naphthyl, 2-naphthyl), acenaphthylenyl, azulenyl, anthryl (e.g., 1-anthryl, 2-anthryl, 9-anthryl) and phenanthryl groups.

Examples of the substituent that a $C_{6-14}$ aryl group represented by, e.g., [A6], may have include those belonging to substituent group 1, substituent group 2 or substituent group 3 and having no ring structure. As an example, a "$C_{1-6}$ (or $C_{1-4}$ or $C_1$-2) alkyl group that may be substituted", represented by [A1] belonging to substituent group 2, is mentioned.

A "$C_{7-16}$ aralkyl group" represented by, e.g., [A7], refers to an alkyl group to which an aryl group is bound. $C_{7-16}$ means that the sum of carbon atoms of the aryl group and the alkyl group is 7 to 16. Examples of the "$C_{7-16}$ aralkyl group" include benzyl, phenethyl, naphthylmethyl and phenylpropyl.

A "5 to 14-membered aromatic heterocyclic group" represented by, e.g., [H1], refers to a monovalent group derived from a compound having a 5 to 14-membered aromatic heterocycle, more specifically, an aromatic ring (monocyclic or polycyclic (condensed ring)) consisting of 5 to 14 members (preferably 5 to 10 members) having at least one (preferably 1 to 4, more preferably 1 to 2) heteroatom selected from the group consisting of a nitrogen atom, a sulfur atom and an oxygen atom, other than carbon atoms, as ring constituent atoms. Heteroatoms may be present at any positions (relative to the position binding to other position as a monovalent group). Examples of the "5 to 14-membered aromatic heterocycle" include:

5 or 6-membered monocyclic aromatic heterocycle groups such as thiophene, franc, pyrrole, imidazole, pyrazole, thiazole, isothiazole, oxazole, isoxazole, pyridine, pyrazine, pyrimidine, pyridazine, 1,2,4-oxadiazole, 1,3,4-oxadiazole, 1,2,4-thiadiazole, 1,3,4-thiadiazole, triazole, tetrazole, and triazine groups; and 8 to 14-membered polycyclic (preferably 2 or 3 cyclic) aromatic heterocycle groups such as benzothiophene, benzofuran, benzimidazole, benzoxazole, benzisoxazole, benzothiazole, benzoisothiazole, benzotriazole, imidazopyridine, thienopyridine, furopyridine, pyrrolopyridine, pyrazolopyridine, oxazolopyridine, thiazolopyridine, imidazopyrazine, imidazopyrimidine, thienopyrimidine, furopyrimidine, pyrrolopyrimidine, pyrazolopyrimidine, oxazolopyrimidine, thiazolopyrimidine, pyrazolopyrimidine, pyrazolotriazine, naphto[2,3-b]thiophene, phenoxathiin, indole, isoindole, 1H-indazole, purine, isoquinoline, quinoline, phthalazine, naphthyridine, quinoxaline, quinazoline, cinnoline, carbazole, β-carboline, phenanthridine, acridine, phenazine, phenothiazine and phenoxazine groups.

A "3 to 14-membered non-aromatic heterocyclic group" represented by, e.g., [H2], refers to a monovalent group derived from a compound having a 3 to 14-membered non-aromatic heterocycle, more specifically, a non-aromatic ring (monocyclic or polycyclic (condensed ring)) consisting of 3 to 14 members (preferably 4 to 10 members) having at least one (preferably 1 to 4, more preferably 1 to 2) heteroatom selected from the group consisting of a nitrogen atom, a sulfur atom and an oxygen atom, other than carbon atoms, as a ring constituent atoms. Heteroatoms may be present at any positions (relative to the position binding to other position as a monovalent group). Examples of the "3 to 14-membered non-aromatic heterocycle" include:

3 to 8-membered monocyclic non-aromatic heterocycle groups such as aziridine, oxirane, thiirane, azetidine, oxetane, thietane, tetrahydrothiophene, tetrahydrofuran, pyrroline, pyrrolidine, imidazoline, imidazolidine, oxazoline, oxazolidine, pyrazoline, pyrazolidine, thiazoline, thiazolidine, tetrahydroisothiazole, tetrahydroxazole, tetrahydroisoxazole, piperidine, piperazine, tetrahydropyridine, dihydropyridine, dihydrothiopyran, tetrahydropyrimidine, tetrahydropyridazine, dihydropyran, tetrahydropyran, tetrahydrothiopyran, morpholine, thiomorpholine, azepanine, diazepan, azepine, azocane, diazocane and oxepane groups; and 9 to 14-membered polycyclic (preferably 2 or 3 cyclic) non-aromatic heterocycles such as dihydrobenzofuran, dihydrobenzimidazole, dihydrobenzoxazole, dihydrobenzothiazole, dihydrobenzisothiazole, dihydronaphtho[2,3-b]thiophene, tetrahydroisoquinoline, tetrahydroquinoline, 4H-quinolizine, indoline, isoindoline, tetrahydrothieno[2,3-c]pyridine, tetrahydrobenzazepine, tetrahydroquinoxaline, tetrahydrophenanthridine, hexahydrophenothiazine, hexahydrophenoxazine, tetrahydrophthalazine, tetrahydronaphthyridine, tetrahydroquinazoline, tetrahydrocinnoline, tetrahydrocarbazole, tetrahydro-β-carboline, tetrahydroacridine, tetrahydrophenazine, tetrahydrothioxanthene and octahydroisoquinoline groups.

Examples of the substituent that a 5 to 14-membered aromatic heterocyclic group represented by, e.g., [H1], and a 3 to 14-membered non-aromatic heterocyclic group represented by, e.g., [H2], may have include those belonging to substituent group 1, substituent group 2 or substituent group 3 and having no ring structure. As an example, a "$C_{1-6}$ (or $C_{1-4}$ or $C_{1-2}$) alkyl group that may be substituted", represented by [A1] belonging to substituent group 2, is mentioned.

A "$C_{1-6}$ alkoxy group" represented by, e.g., [O11a] is a group obtained by binding a "$C_{1-6}$ alkyl group" to an oxygen atom, i.e., a linear or branched alkoxy group having 1 to 6 carbon atoms. Examples of the "$C_{1-6}$ alkoxy group" include methoxy, ethoxy, propoxy, isopropoxy, butoxy, isobutoxy, sec-butoxy, tert-butoxy, pentyloxy, isopentyloxy, neopentyloxy and hexyloxy groups.

A "$C_{6-14}$ aryloxy group" represented by, e.g., [O11b], "$C_{7-16}$ aralkyloxy group" represented by [O11c], "5 to 14-membered aromatic heterocyclic oxy group" represented by [O11d] and "3 to 14-membered non-aromatic heterocyclic oxy group" represented by [O11e] are groups obtained by binding a $C_{6-14}$ aryl group, $C_{7-16}$ aralkyl group, 5 to 14-membered aromatic heterocyclic group and 3 to 14-membered non-aromatic heterocyclic group as mentioned above, respectively to an oxygen atom.

A "$C_{1-6}$ alkyl-carbonyloxy group" represented by, e.g., [O12a], "$C_{6-14}$ aryl-carbonyloxy group" represented by [O12b], "5 to 14-membered aromatic heterocyclic carbonyloxy group" represented by [O12c], "3 to 14-membered non-aromatic heterocyclic carbonyloxy group" represented by [O12d] and "$C_{1-6}$ alkoxy-carbonyloxy group" represented by [O12e] are groups obtained by binding a $C_{1-6}$ alkyl group, a $C_{6-14}$ aryl group, a 5 to 14-membered aromatic heterocyclic group, a 3 to 14-membered non-aromatic heterocyclic group and a $C_{1-6}$ alkoxy group as mentioned above, respectively to a carbonyloxy group.

A "mono- or di-$C_{1-6}$ alkyl-carbamoyloxy group" represented by [O13a] and a "$C_{6-14}$ aryl-carbamoyloxy group" represented by [O13b] are groups obtained by binding a $C_{1-6}$ alkyl group (1 or 2) and a $C_{6-14}$ aryl group, as mentioned above, respectively to a carbamoyloxy group, —O—CO—NH$_2$.

A "$C_{1-6}$ alkylsulfonyloxy group that may be halogenated" represented by [O14a] and a "$C_{6-14}$ aryl-sulfonyloxy group that may be substituted with a $C_{1-6}$ alkyl group" represented by [O14b] are groups obtained by binding, as a substituent, a $C_{1-6}$ alkyl group that may be halogenated and a $C_{6-14}$ aryl group that may be substituted with a $C_{1-6}$ alkyl group, as mentioned above, respectively to a sulfonyloxy group, —O—SO$_3$H.

A "$C_{1-6}$ alkylthio group that may be halogenated" represented by [S11] is a group obtained by binding a $C_{1-6}$ alkyl group that may be halogenated as mentioned above to a sulfur atom.

A "$C_{1-6}$ alkylsulfonyl group that may be halogenated" represented by [S21a], a "$C_{6-14}$ arylsulfonyl group" represented by [S21b] and a "5 to 14-membered aromatic heterocyclic sulfonyl group" represented by [S21c] are groups obtained by binding a $C_{1-6}$ alkyl group that may be halogenated, a $C_{6-14}$ aryl group and a 5 to 14-membered aromatic heterocyclic group, as mentioned above, respectively to a sulfonyl group, —S(=O)$_2$—.

A "$C_{1-6}$ alkylsulfinyl group that may be halogenated" represented by [S22a], a "$C_{6-14}$ arylsulfinyl group" represented by [S22b] and a "5 to 14-membered aromatic heterocyclic sulfinyl group" represented by [S22c] are groups obtained by binding a $C_{1-6}$ alkyl group that may be halogenated, a $C_{6-14}$ aryl group and a 5 to 14-membered aromatic heterocyclic group, as mentioned above, respectively to a sulfinyl group —S(=O)—.

A "mono- or di-$C_{1-6}$ alkylamino group" represented by [N11a], a "$C_{6-14}$ arylamino group" represented by [N11b], a "5 to 14-membered aromatic heterocyclic amino group" represented by [N11c] and a "$C_{7-16}$ aralkylamino group" represented by [N11d] are groups obtained by binding a $C_{1-6}$ alkyl group (1 or 2), a $C_{6-14}$ aryl group, a 5 to 14-membered aromatic heterocyclic group and a $C_{7-16}$ aralkyl group, as mentioned above, respectively to an amino group, —NH$_2$.

A formylamino group represented by [N12a] is a group obtained by binding a formyl group to an amino group. A "$C_{1-6}$ alkyl-carbonylamino group" represented by [N12b], a "($C_{1-6}$ alkyl) ($C_{1-6}$ alkyl-carbonyl) amino group" represented by [N12c], a "$C_{6-14}$ aryl-carbonylamino group" represented by [N12d], a "$C_{1-6}$ alkoxy-carbonylamino group" represented by [N12e] and a "$C_{7-16}$ aralkyloxy-carbonylamino group" represented by [N12f] are groups obtained by binding a $C_{1-6}$ alkyl group, a $C_{1-6}$ alkyl group, a $C_{1-6}$ alkyl-carbonyl group, a $C_{6-14}$ aryl group, a $C_{1-6}$ alkoxy group and a $C_{7-16}$ aralkyloxy group, as mentioned above, respectively to a carbonylamino group, —NH—CO—.

A "$C_{1-6}$ alkylsulfonylamino group" represented by [N13a] and a "$C_{6-14}$ arylsulfonylamino group that may be substituted with a $C_{1-6}$ alkyl group" represented by [N13b] are groups obtained by binding a $C_{1-6}$ alkyl group and a $C_{6-14}$ aryl group that may be substituted with a $C_{1-6}$ alkyl group, as mentioned above, respectively to a sulfonylamino group, —NH—SO$_2$—.

A "$C_{1-6}$ alkyl-carbonyl group that may be halogenated" represented by [C11a], a "$C_{6-14}$ aryl-carbonyl group" represented by [C11b], a "5 to 14-membered aromatic heterocyclic carbonyl group" represented by [C11c] and a "3 to 14-membered non-aromatic heterocyclic carbonyl group" represented by [C11d] are groups obtained by binding a $C_{1-6}$ alkyl group that may be halogenated, a $C_{6-14}$ aryl group, a 5 to 14-membered aromatic heterocyclic group and a 3 to 14-membered non-aromatic heterocyclic group, as mentioned above, respectively to a carbonyl group, —C(=O)—.

A "$C_{1-6}$ alkoxy-carbonyl group" represented by [C21a], a "$C_{6-14}$ aryloxy-carbonyl group" represented by [C21b] and a "$C_{7-16}$ aralkyloxy-carbonyl group" represented by [C21c] are groups obtained by binding, a $C_{1-6}$ alkoxy group that may be halogenated, a $C_{6-14}$ aryloxy group and a $C_{7-16}$ aralkyloxy group, as mentioned above, respectively to a carbonyl group, —C(=O)—.

A "mono- or di-$C_{1-6}$ alkyl-carbamoyl group" represented by [C41a], a "$C_{6-14}$ aryl-carbamoyl group" represented by [C41b], a "5 to 14-membered aromatic heterocyclic carbamoyl group" represented by [C41c] and a "3 to 14-membered non-aromatic heterocyclic carbamoyl group" represented by [C41d] are groups obtained by binding a $C_{1-6}$ alkyl group (1 or 2), a $C_{6-14}$ aryl group, a 5 to 14-membered aromatic heterocyclic group and a 3 to 14-membered non-aromatic heterocyclic group, as mentioned above, respectively to a carbamoyl group, —CO—NH$_2$, as a substituent for the nitrogen atom.

In the present invention, preferable examples of R include a monovalent substituent of an aromatic or non-aromatic 3 to 14-membered ring which may be unsubstituted or substituted and monocyclic or polycyclic, and of substituent group 2 (mentioned above), [A4] a $C_{3-10}$ cycloalkyl group, [A5] a $C_{3-10}$ cycloalkenyl group, [A6] a $C_{6-14}$ aryl group that may be substituted, [H1] a 5 to 14-membered aromatic heterocyclic group that may be substituted, and [H2] a 3 to 14-membered non-aromatic heterocyclic group that may be substituted. In a preferable embodiment herein, formula (1) can be expressed as the following formula (2).

[Formula 7]

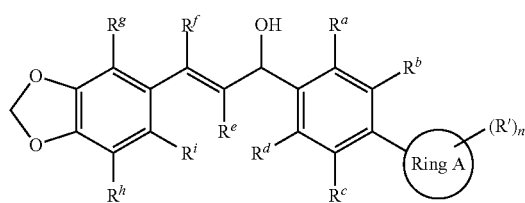

(2)

In formula (2), Ring A may be a monovalent substituent of an aromatic or non-aromatic 3 to 14-membered ring which may be unsubstituted or substituted and monocyclic or polycyclic, for example, [A4], [A5], [A6], [H1] and [H2] belonging to substituent group 2 (mentioned above). R' represents any substituent binding to Ring A, for example, substituents belonging to substituent group 1, and substituents belonging to substituent group 2 or substituent group 3 and having no ring structure. For example, [A1] belonging to substituent group 2 and a "$C_{1-6}$ (or $C_{1-4}$ or $C_{1-2}$) alkyl group that may be substituted" (more specifically, substituents previously mentioned that, e.g., [A6], [H1] and [H2] of substituent group 2 may further have). Reference symbol "n" represents the number of substituents that Ring A has. More specifically, if Ring A has no substituents, "n" represents 0. If Ring A has a substituent, "n" represents an integer of 1 or more (preferably 1, 2 or 3). A substituent represented by R' may bind to any site within Ring A.

In the present invention, more preferable examples of R (Ring A) include a monovalent substituent of an aromatic or non-aromatic 5 to 10-membered ring, particularly a 5 or 6-membered ring which may be unsubstituted or substituted and monocyclic or polycyclic, for example, a phenyl group, pyridyl group (for example, 2-pyridyl group), thienyl group (for example, 2-thienyl group), cyclohexenyl group (for example, 1-cyclohexenyl group) and cyclopentenyl group (for example, 1-cyclopentenyl group) that may be substituted. Preferred formulae (1) and (2) in the present invention can be expressed as the following formulae (3) to (7) In formulae (3) to (7), R' and "n" are the same as defined in formula (2).

[Formula 8-1]

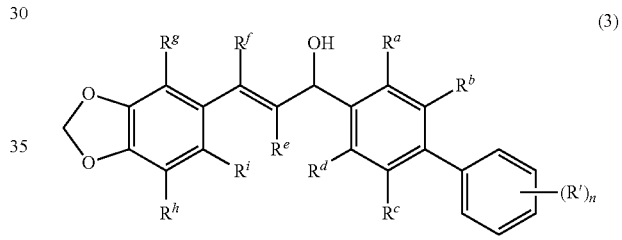

(3)

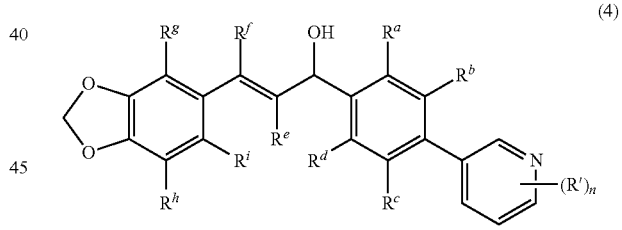

(4)

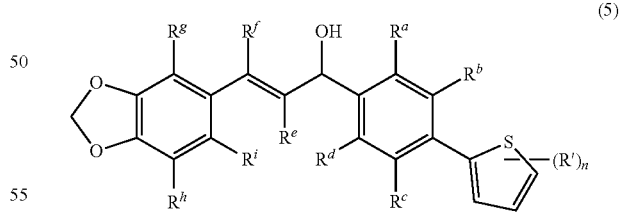

(5)

[Formula 8-1]

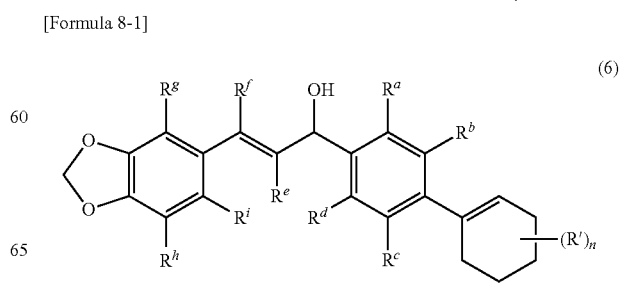

(6)

-continued (7)

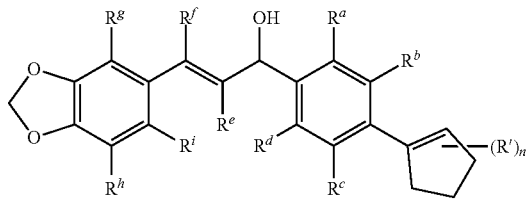

In formula (1), $R^a$, $R^b$, $R^c$, $R^d$, $R^e$, $R^f$, $R^g$, $R^h$ and $R^i$ may be all hydrogen atoms (unsubstituted) or at least one of them may be a substituent. To describe more specifically, (i) $R^a$, $R^b$, $R^c$ and $R^d$ may be all hydrogen atoms (unsubstituted) or at least one of them may be a substituent; (ii) $R^e$ and $R^f$ may be both hydrogen atoms (unsubstituted) or at least one of them may be a substituent; and (iii) $R^g$, $R^h$ and $R^i$ may be all hydrogen atoms (unsubstituted) or at least one of them may be a substituent. In formula (1), the above definitions (i), (ii) and (iii) may be optionally used in combination. In an aspect of the present invention, it is possible to define that $R^e$ and $R^f$ in the above (ii) and $R^g$, $R^h$ and $R^i$ in the above (iii) may be all, for example, hydrogen atoms (unsubstituted), and $R^a$, $R^b$, $R^c$ and $R^d$ in the above (i) may be all hydrogen atoms (unsubstituted) or at least one of them may be a substituent.

If $R^a$, $R^b$, $R^c$, $R^d$, $R^e$, $R^f$, $R^g$, $R^h$ or $R^i$ is a substituent, each substituent may be selected, for example, from those belonging to substituent group 1, substituent group 2 or substituent group 3. In an aspect of the present invention, if $R^a$, $R^b$, $R^c$, $R^d$, $R^e$, $R^f$, $R^g$, $R^h$ or $R^i$ is a substituent, each substituent is preferably a group belonging to substituent group 1, substituent group 2 or substituent group 3 and having no ring structure.

In an aspect of the present invention, it is preferable that $R^a$, $R^b$, $R^c$, $R^d$, $R^e$, $R^E$, $R^g$, $R^h$ and $R^i$ are all hydrogen atoms (unsubstituted). If such an embodiment is employed, formulae (1) to (7) may be expressed as the following formulae (1A) to (7A).

[Formula 9-1]

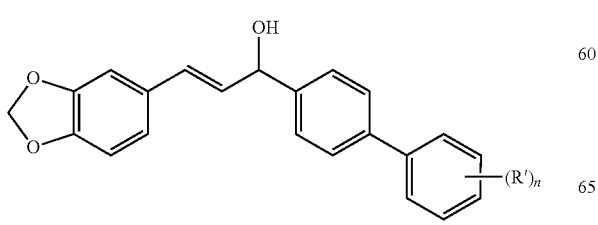

[Formula 9-2]

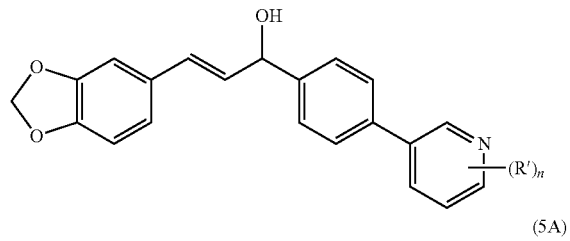

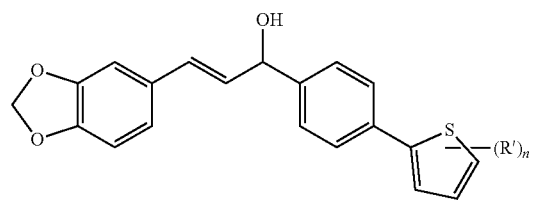

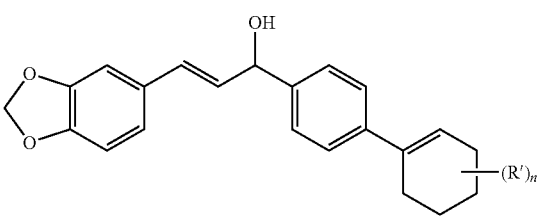

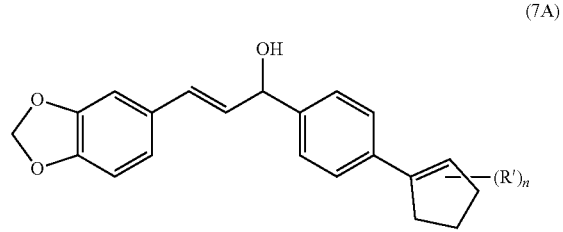

In an aspect of the present invention, $R^e$, $R^f$, $R^g$, $R^h$ and $R^i$ are preferably all hydrogen atoms (unsubstituted) If such an embodiment is employed, formulae (1) to (7) can be expressed as the following formulae (1B) to (7B). $R^a$, $R^b$, $R^c$ and $R^d$ may be each independently a hydrogen atom (unsubstituted) or a substituent. If $R^a$, $R^b$, $R^c$ and $R^d$ are all hydrogen atoms, formulae (1) to (7) are the same as the above formulae (1A) to (7A). If at least one of $R^a$, $R^b$, $R^c$ and $R^d$ is a substituent, more specifically, if $R^a$ and $R^b$ are hydrogen atoms (unsubstituted), one or both of $R^c$ and $R^d$ is a substituent, formulae (1) to (7) may be also expressed as formulae (1B) to (7B), which are narrowly defined so as not to overlap with the definitions of the above formulae (1A) to (7A).

[Formula 10-1]

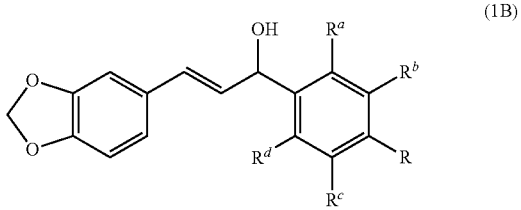

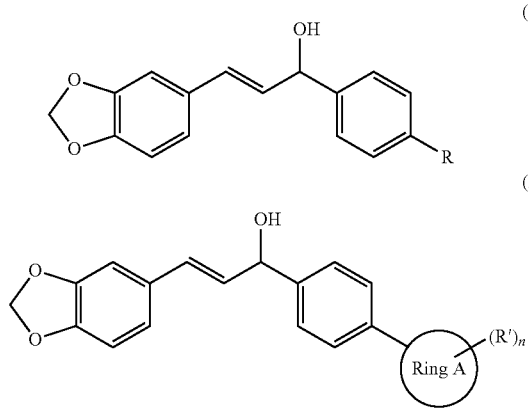

[Formula 10-2]

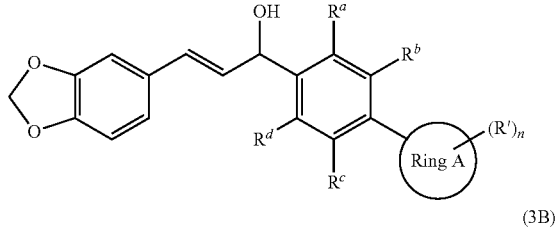

(2B)

(3B)

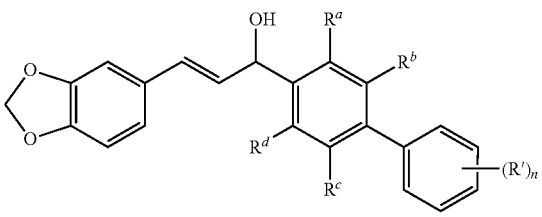

(4B)

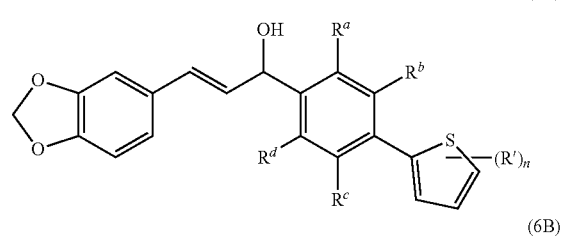

(5B)

(6B)

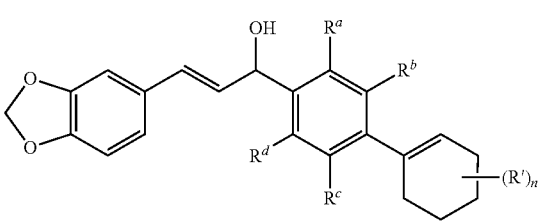

(7B)

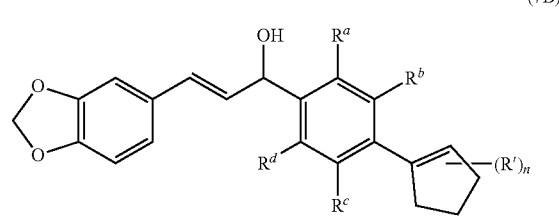

In an aspect of the present invention, the compound of the present invention is a compound represented by the following formula (1'), more specifically, Compound (1'). Compound (1') and a compound represented by the above formula (1), i.e., Compound (1), are mutually cis-trans isomers (E,Z-forms) with respect to a double bond(s) shown in the formulae. For convenience, Compound (1') is referred to as a cis-form, whereas Compound (1) as a trans-form. In the specification, description on Compound (1) and the same trans forms as Compound (1) (more specifically Compounds (2) to (7), formulae (1A) to (7A) and formulae (1B) to (7B)), for example, definitions of substituents in the formulae, can apply to Compound (1') and the same cis-forms as the compound (1') (more specifically, cis-form compounds corresponding to trans-form Compounds (2) to (7), formulae (1A) to (7A) and formulae (1B) to (7B), respectively, e.g., a compound represented by the following formula (1'A)). In the specification, embodiments of "the compound of the present invention (or the like)" and description on effects or the like can apply to not only a trans-form of, e.g., Compound (1) but also a cis-form of, e.g., Compound (1').

[Formula 11]

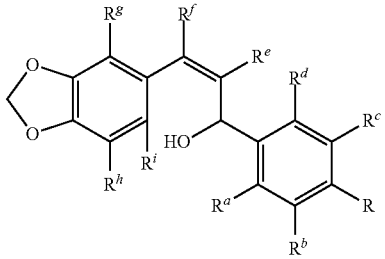

(1')

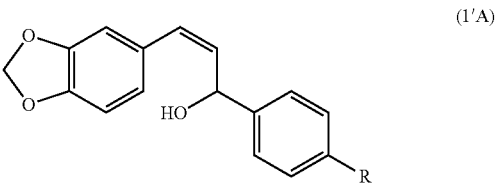

(1'A)

The compound of the present invention can be in the form of a salt. The compound of the present invention and a salt thereof can be in the form of a solvate.

If the compound of the present invention has an acidic group or a basic group, the acidic group and the basic group can be reacted with a base and an acid, respectively, to obtain a "salt" (basic salt or acid salt) of the compound of the present invention. If a salt of the compound of the present invention is used as an active ingredient of a medicament (in preparation of a pharmaceutical composition), it is proper that the salt is pharmaceutically acceptable.

Examples of the "basic salt" include alkali metal salts such as a sodium salt, a potassium salt and a lithium salt; alkaline earth metal salts such as a magnesium salt and a calcium salt; organic base salts such as a N-methyl morpholine salt, a triethylamine salt, a tributylamine salt, a diisopropylethylamine salt, a dicyclohexylamine salt, a N-methyl piperidine salt, a pyridine salt, a 4-pyrrolidinohyridine salt and a picoline salt; and amino acid salts such as a glycine salt, a lysine salt, an arginine salt, an ornithine salt, a glutamate and an aspartate.

Examples of the "acid salt" include hydrogen halide salts such as hydrofluoride, a hydrochloride, a hydrobromide and a hydroiodide; inorganic acid salts such as a nitrate, a perchlorate, a sulfate and a phosphate; alkanesulfonates such as a methanesulfonate, a trifluoromethanesulfonate and an ethanesulfonate; aryl sulfonates such as a benzenesulfonate and a p-toluene sulfonate; organic acid salts such as an acetate, a malate, a fumarate, a succinate, a citrate, an ascorbate, a tartrate, an oxalate and a maleate; and amino acid salts such as chrysin salt, a lysine salt, an arginine salt, an ornithine salt, a glutamate and an aspartate.

A "solvate" of the compound of the present invention or a salt thereof can be obtained by coordinating solvent molecules to the compound of the present invention or a salt thereof (for example, by mixing with a solvent, and thereafter, crystallizing the compound or the salt thereof). Examples of such a "solvate" include a hydrate, an ethanol solvate and a dimethyl sulfoxide solvate.

The compound of the present invention (novel stiripentol derivative) can be synthesized by those skilled in the art (for example, Tokyo Kasei Kogyo Co., Ltd., described in Examples) by using routine procedures (reaction process, reaction, conditions, steps, device, etc.) or means commonly known in the technical field or by outsourcing to those skilled in the art. Salts of the compound of the present invention and solvates of the compound of the present invention and salts thereof can be obtained by routine procedures or means commonly known in the technical field.

A method for synthesizing the compound of the present invention will be more specifically disclosed in Examples (described later). A starting compound can be changed and reaction conditions can be controlled depending on the desired compound to be obtained. The scheme for synthesis is schematically as follows: (i) a step of subjecting an organic halogen compound such as 4-halogenated acetophenone or a derivative thereof (e.g., a compound having $R^a$ to $R^d$ corresponding to those of a desired compound) and an organic boron compound such as R—B(OH)$_2$ (R is the same as defined in, e.g., formula (1)) to a cross-coupling reaction (Suzuki-Miyaura cross-coupling reaction) in the presence of a palladium catalyst to obtain a first intermediate; (ii) a step of reacting the first intermediate with piperonal or a derivative thereof (e.g., a compound having $R^e$ to $R^i$ corresponding to those of a desired compound) to obtain a second intermediate; and (iii) a step of reducing the carbonyl group of the second intermediate into a hydroxy group with a hydride reducing agent to obtain the desired compound.

The compound or the like of the present invention thus synthesized can be isolated/purified by routine procedures or means commonly known in the technical field, such as extraction, precipitation, distillation, chromatography, fractional crystallization and recrystallization. The chemical structure of the compound or the like of the present invention can be identified by a device and analysis method commonly used in the technical field, such as 1H-NMR, 13C-NMR, HPLC and high-resolution liquid chromatograph mass spectrometer (LC-MS/MS).

Use of the compound or the like of the present invention is not particularly limited. Typically, the compound or the like of the present invention can be used as a lactate dehydrogenase (LDH) inhibitor as described in the following or an active ingredient of a medicament such as an antiepileptic agent and an anti-cancer agent.

—Lactate Dehydrogenase Inhibitor—

The lactate dehydrogenase (LDH) inhibitor of the present invention contains the compound of the present invention, a salt or a solvate thereof (the compound or the like of the present invention). In other words, the compound or the like of the present invention to be used in the condition (in particular, dose) for exerting LDH inhibitory activity in vitro or in vivo can be referred to as the LDH inhibitor of the present invention.

Lactate dehydrogenase (LDH) is a protein having a molecular weight of about 140 kD and catalyzing interconversion reaction between lactic acid (L-lactic acid, in vivo) and pyruvate (during the reaction, interconversion between NADH and NAD simultaneously occurs). LDH is a tetramer consisting of two types of subunits, LDHA (M) and LDHB (H). LDH has 5 types of isozymes, i.e., LDH1 (4 LDHB units), LDH2 (3 LDHB units and a single LDHA unit), LDH3 (2 LDHB units and 2 LDHA units), LDH4 (single LDHB units and 3 LDHA units) and LDH5 (4 LDHA units), which vary in binding mode of these subunits. For example, in astrocytes of the brain, a pyruvate is converted into L-lactic acid by LDH5. In contrast, L-lactic acid taken in neuron (nerve cells) is converted into pyruvate by LDH1. In cancer cells, energy is produced from conversion of pyruvate into lactic acid even if the condition is not hypoxic. For energy production, the expression level of LDH5 is significantly high. The LDH inhibitor of the present invention may target any one of the isoenzymes mentioned above. The LDH inhibitor of the present invention is satisfactory if it has an inhibitory activity against at least one of the isoenzymes, and preferable if it has an inhibitory activity against, for example, either one or both of LDH1 and LDH5.

The LDH inhibitor of the present invention can target not only LDHs derived from humans but also LDHs derived from animals, e.g., mammals having LDH except humans, such as a mouse, a rat, a guinea pig, a rabbit, a goat, a cat, a dog, a pig and a monkey. Accordingly, the medicament of the present invention containing the LDH inhibitor of the present invention (the compound or the like of the present invention) as an active ingredient can target not only humans but also animals except humans.

—Medicament—

The medicament of the present invention contains the compound of the present invention or the LDH inhibitor of the present invention, as an active ingredient. Note that, the term "medicament" includes not only pharmaceuticals approved by regulations in individual countries but also pharmaceuticals to be used in clinical trials or the like before approval. The "medicament" refers to a pharmaceutical approved to have a therapeutic or (relapse) prevention effect (collectively referred to as a "medicinal effect" herein) to a predetermined disease. The presence or absence of a medicinal effect can be determined based on appropriate criteria depending on the disease and purpose.

The medicament of the present invention can target diseases on which the LDH inhibitory activity of the compound of the present invention exerts a medicinal effect, in other words, diseases whose symptom and lesional tissue are effectively treated, improved, relieved and/or prevented by inhibition of LDH. Representative examples of the diseases are epilepsy and cancer. In other words, representative examples of the medicament of the present invention are an antiepileptic agent and anti-cancer agent. However, the medicament of the present invention is not limited to these. The medicament of the present invention can target other diseases having the aforementioned mechanism of action, for example, diseases such as calcium oxalate calculosis and neuropathic pain, on which stiripentol is reported to have medicinal effect.

The type of "epilepsy", targeted by the medicament of the present invention, is not particularly limited. For example, the medicament of the present invention (an antiepileptic agent) preferably targets intractable epilepsy for which an effective existing drug has not been found, such as adult refractory epilepsy (mesiotemporal lobe epilepsy associating hippocampal sclerosis) for which stiripentol is not effective.

Examples of "cancer" targeted by the medicament of the present invention include, but are not particularly limited to, malignant lymphoma (e.g., Hodgkin lymphoma, non-Hodgkin lymphoma), stomach cancer, penile cancer, pharyngeal cancer (e.g., nasopharyngeal cancer, oropharyngeal cancer, hypopharyngeal cancer), vulvar cancer, pituitary adenoma, hepatocellular carcinoma, thymoma, mycosis fungoides, cancer of unknown primary, myelodysplastic syndrome, uterine cancer (e.g., cervical cancer, uterine body cancer, uterine sarcoma), chorionic disease, esophageal cancer, renal meng carcinoma, ureteral cancer, glioma, renal cell carcinoma, pancreatic cancer, pancreatic endocrine tumor, testicular tumor, prostate cancer, colorectal cancer (e.g., cecal cancer, colon cancer, rectal cancer), multiple myeloma, bile duct cancer, gallbladder cancer, vaginal cancer, mesothelioma, acoustic schwannoma, soft tissue sarcoma, breast cancer, brain tumor, lung cancer, leukemia (e.g., acute myeloid leukemia, acute lymphocytic leukemia, adult T cell leukemia lymphoma, chronic myeloid leukemia, chronic lymphocytic leukemia), skin cancer (e.g., malignant melanoma), bladder cancer, chronic myeloproliferative disease, ovarian cancer, and ovarian germ cell tumor. For example, the medicament of the present invention (an anti-cancer agent) preferably targets intractable cancers such as pancreatic cancer for which lactate dehydrogenase inhibition is effective.

The dosage and administration (e.g., administration route/site, timing of administration, dose per time, dosing frequency per day, dosing period) of the medicament of the present invention are not particularly limited. Appropriate dosage and administration can be determined based on in vitro or in vivo tests carried out in consideration of the patient's age, gender, body weight, disease condition and concomitant medication so as to exert a desired therapeutic effect.

The medicament of the present invention is generally prepared as a pharmaceutical composition containing an active ingredient (an effective amount of the compounds of the present invention) and pharmaceutically acceptable additives. For oral administration, the pharmaceutical composition of the present invention can be prepared into a dosage form such as a tablet, a capsule, a granule, a powder, a dry syrup, a liquid (including, e.g., a syrup, and an external liquid), a suppository, an ointment, a cream agent, an eye drop, a nasal drop and a patch. For parenteral administration, the pharmaceutical composition of the present invention can be prepared into a dosage form such as an injection. The additives can be appropriately selected depending on the dosage form. Examples of additives include an excipient, a thickening agent, a diluent (e.g., solvent for injection), a stabilizer and a preservative. The pharmaceutical composition can be prepared according to a method commonly known in the technical field, by adding an appropriate amount of an active ingredient and additives depending on the dosage form.

Now, embodiments of, e.g., the compound of the present invention, LDH inhibitor and medicament will be more specifically disclosed by way of Examples but the technical scope of the present invention is not limited by the specific embodiments disclosed as Examples. Those skilled in the art can understand that the embodiments disclosed in Examples are expanded and modified into other forms, or that, if necessary, technical features of the prior art (inventions already disclosed) are further used in combination or the prior art (inventions already disclosed) are used in combination so as to satisfy a desired object and effect, based on the technical idea and the entire description of the specification including drawings of the present invention.

EXAMPLES

<Compound>

Compounds No. 1 to No. 10 used in Examples are listed in the following tables. The compound No. 1 (CAS: 42580-60-9) is a compound of the prior invention disclosed in Patent Literature 1. Compounds No. 2 to No. 10 are novel compounds disclosed by the present invention. Compounds No. 1 to No. 10 were prepared by an outsource, Tokyo Chemical Industry Co., Ltd. The purities and shapes of the compounds are also shown in the following tables. Of the novel compounds, Compounds No. 4 to No. 8 and No. 10 were selected as representative examples and the synthesis methods thereof will be described below. Note that, the yields of compounds by the synthetic methods are all isolated yields.

TABLE 1-1

| Compound | Structural formula | Purity | Shape |
| --- | --- | --- | --- |
| No. 1 | 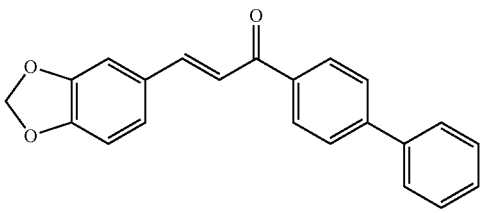<br>(IV) | 98.3% | Yellow solid |
| No. 2 | 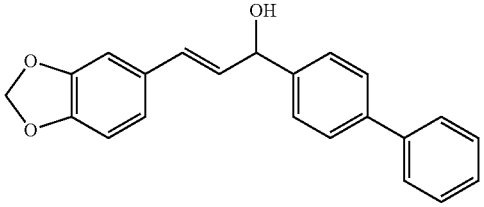<br>(3A-1) | 97.1% | Colorless solid (white solid) |

TABLE 1-1-continued
| Compound | Structural formula | Purity | Shape |
|---|---|---|---|
| No. 3 | 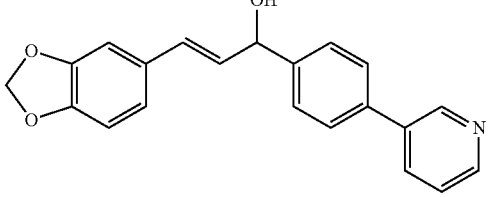<br>(4A-1) | 99.7% | Colorless solid (white solid) |
| No. 4 | 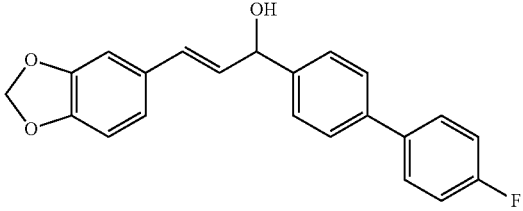<br>(3A-2) | 98.6% | Colorless solid (white solid) |
| No. 5 | 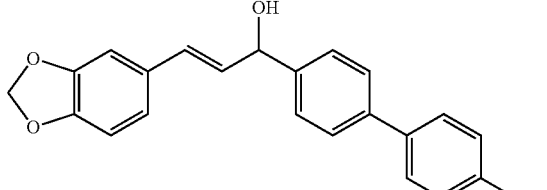<br>(3A-3) | 96.2% | Light-yellow solid |
| No. 6 | 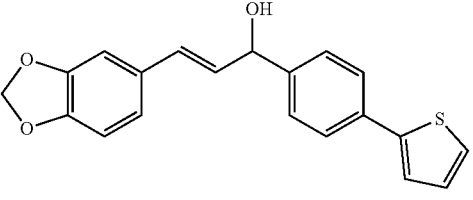<br>(5A-1) | 99.5% | Light-yellow solid |
| No. 7 | 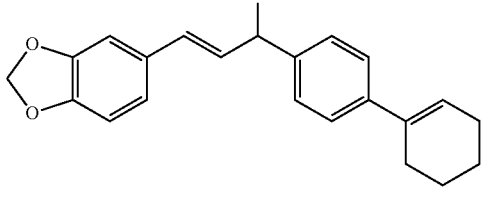<br>(6A-1) | 99.0% | Colorless solid (white solid) |
| No. 8 | 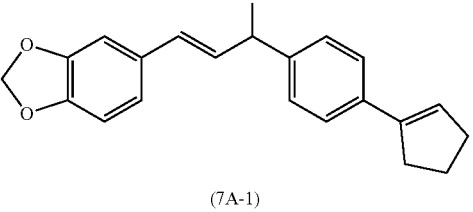<br>(7A-1) | 95.1% | Colorless solid (white solid) |

TABLE 1-2

| Compound | Structural formula | Purity | Shape |
|---|---|---|---|
| No. 9 | (3B-1) | 98.1% | Colorless solid (white solid) |
| No. 10 | (3B-2) | 97.5% | Colorless solid (white solid) |

[Synthesis of Compound No. 4]

[Formula 12]

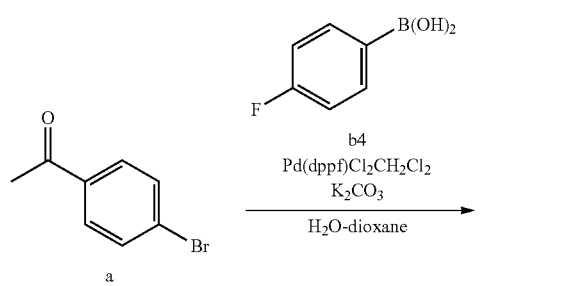

(1) Synthesis of Intermediate Compound c4

4'-Bromoacetophenone (Compound a) (200 mg, 1.01 mmol), 4-fluorophenylboronic acid (Compound b4) (141 mg, 1.01 mmol), Pd(dppf)Cl$_2$·CH$_2$Cl$_2$ (82.1 mg, 0.101 mmol), K$_2$CO$_3$ (278 mg, 2.01 mmol), water (1.0 mL) and 1,4-dioxane (1.7 mL) were mixed. The mixed solution was subjected to nitrogen purge and stirred at 80° C. for 2 hours. After the reaction solution was cooled to ambient temperature, 2 N hydrochloric acid (10 mL) was added. The reaction solution was stirred for 10 minutes and filtered to remove a solid substance (filtration aid: cellulose). The filtrate was washed with ethyl acetate. To the filtrate, ethyl acetate (15 mL) was added. The filtrate was washed sequentially with water and saturated saline. The organic layer was dried over anhydrous sodium sulfate, filtered and concentrated under reduced pressure. The residue thus obtained was purified by silica gel column chromatography (silica gel, methylene chloride/ethyl acetate) to obtain a first intermediate, Compound c4 (207 mg, 0.966 mmol, yield 96%) as a pale-pink solid substance.

(2) Synthesis of Intermediate Compound e4

Compound c4 (207 mg, 0.966 mmol), piperonal (Compound d) (218 mg, 1.45 mmol), sodium hydroxide (46.4 mg, 1.16 mmol), water (0.1 mL) and methanol (4.8 mL) were mixed. The mixed solution was stirred at 65° C. for 15 hours.

After the reaction solution was cooled to ambient temperature, water (10 mL) was added. A solid substance was separated by filtration and washed with water and methanol. The residue was dried under reduced pressure to obtain a second intermediate, Compound e4 (316 mg, 0.912 mmol, yield 94%) as a yellow solid substance.

(3) Synthesis of Desired Compound No. 4

Compound e4 (316 mg, 0.912 mmol), tetrahydrofuran (4.6 mL), and methanol (4.6 mL) were mixed. To the mixed solution, NaBH$_4$ (69.0 mg, 1.83 mmol) was added. The reaction solution was stirred at ambient temperature for 1.5 hours. To the reaction solution, ethyl acetate (15 mL) was added. The solution was washed sequentially with water and saturated saline. The organic layer was dried over anhydrous sodium sulfate, filtered and concentrated under reduced pressure. The residue thus obtained was suspended in toluene (10 mL), dissolved by heating it up to 60° C., and thereafter, cooled to ambient temperature. The resulting precipitate was filtered, washed with toluene and dried under reduced pressure to obtain a desired product, Compound No. 4 (139 mg, 0.399 mmol, yield 44%) as a colorless solid substance.

Synthesis of Compound No. 5

[Formula 13]

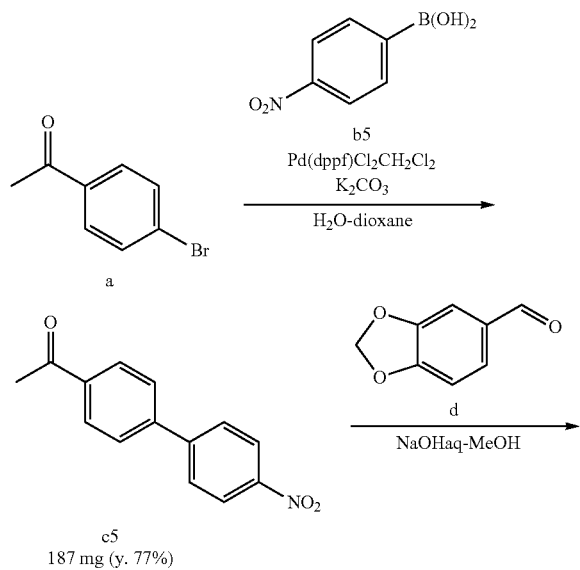

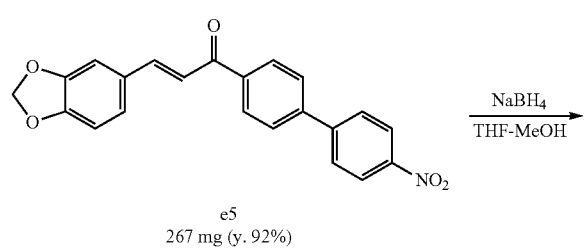

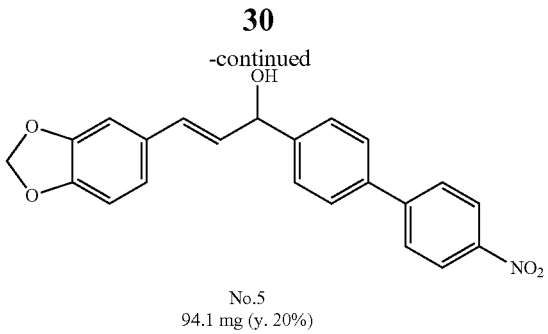

No.5
94.1 mg (y. 20%)

(1) Synthesis of Intermediate Compound c5

4'-Bromoacetophenone (Compound a) (200 mg, 1.01 mmol), 4-nitrophenylboronic acid (Compound b5) (168 mg, 1.01 mmol), Pd(dppf)Cl$_2$·CH$_2$Cl$_2$ (82.1 mg, 0.101 mmol), K$_2$CO$_3$ (278 mg, 2.01 mmol), water (1.0 mL) and 1,4-dioxane (1.7 mL) were mixed. The mixed solution was subjected to nitrogen purge and stirred at 80° C. for 2.5 hours. After the reaction solution was cooled to ambient temperature, 2 N hydrochloric acid (10 mL) was added. The resulting reaction solution was stirred for 10 minutes, and a solid substance was separated by filtration (filtration aid: cellulose) and washed with ethyl acetate. To the filtrate, ethyl acetate (15 mL) was added. The filtrate was washed sequentially with water and saturated saline. The organic layer was dried over anhydrous sodium sulfate, filtered and concentrated under reduced pressure. The residue thus obtained was purified by silica gel column chromatography (silica gel, methylene chloride/ethyl acetate) to obtain a first intermediate, Compound c5 (187 mg, 0.775 mmol, yield 77%) as a light-yellow solid substance.

(2) Synthesis of Intermediate Compound e5

Compound c5 (187 mg, 0.775 mmol), piperonal (compound d) (175 mg, 1.16 mmol), sodium hydroxide (37.2 mg, 0.930 mmol), water (0.1 mL) and methanol (3.9 mL) were mixed. The mixed solution was stirred at 65° C. for 13 hours. After the reaction solution was cooled to ambient temperature, water (10 mL) was added. A resulting solid substance was separated by filtration and washed with water and methanol. The residue was dried under reduced pressure to obtain a second intermediate, Compound e5 (267 mg, 0.715 mmol, yield 92%) as a light-yellow solid substance.

(3) Synthesis of Desired Compound No. 5

Compound e5 (267 mg, 0.715 mmol), tetrahydrofuran (3.6 mL), and methanol (3.6 mL) were mixed. To the mixed solution, NaBH$_4$ (54.1 mg, 1.43 mmol) was added. The reaction solution was stirred at ambient temperature for 5 hours. To the resulting reaction solution, ethyl acetate (15 mL) was added. The solution was washed sequentially with water and saturated saline. The resulting organic layer was dried over anhydrous sodium sulfate, filtered and concentrated under reduced pressure. The residue thus obtained was purified by silica gel column chromatography (silica gel, hexane/methylene chloride) to obtain a desired product, Compound No. 5 (54.1 mg, 0.144 mmol, yield 20%) as a light-yellow solid substance.

Synthesis of Compound No. 6

[Formula 14]

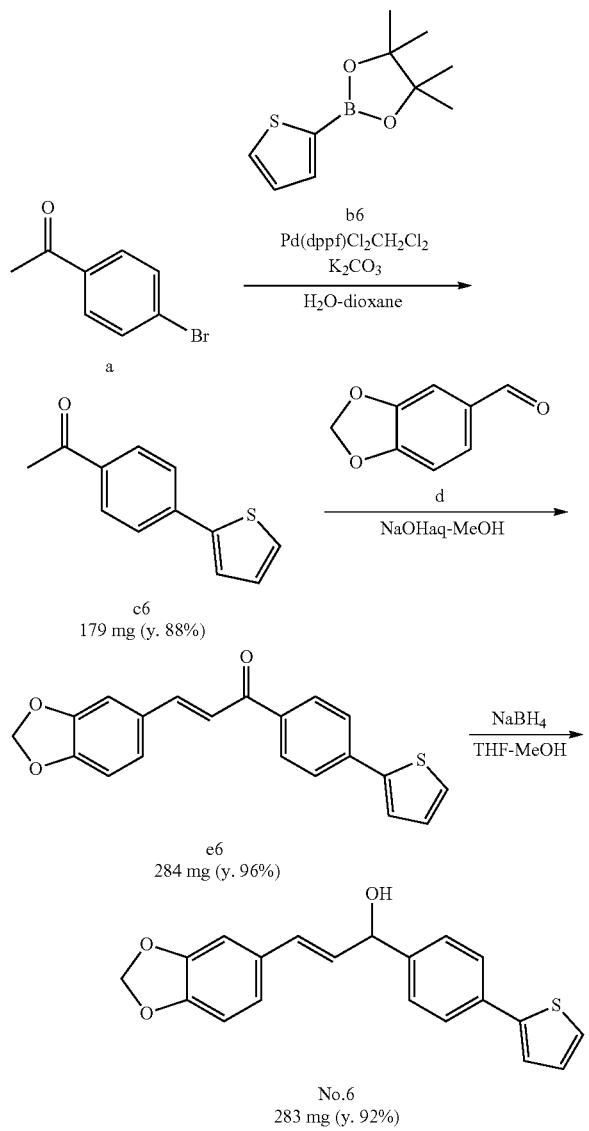

(1) Synthesis of Intermediate Compound c6

4'-Bromoacetophenone (Compound a) (200 mg, 1.01 mmol), 2-thiopheneboronic acid pinacol (Compound b6) (211 mg, 1.01 mmol), Pd(dppf)Cl$_2$·CH$_2$Cl$_2$ (82.1 mg, 0.101 mmol), K$_2$CO$_3$ (278 mg, 2.01 mmol), water (1.0 mL) and 1,4-dioxane (1.7 mL) were mixed. The mixed solution was subjected to nitrogen purge, and stirred at 80° C. for 1.5 hours. After the reaction solution was cooled to ambient temperature, 2 N hydrochloric acid (10 mL) was added. The resulting reaction solution was stirred for 10 minutes, and a solid substance was separated by filtration (filtration aid: cellulose) and washed with ethyl acetate. To the filtrate, ethyl acetate (15 mL) was added. The resulting filtrate was washed sequentially with water and saturated saline. The organic layer was dried over anhydrous sodium sulfate, filtered and concentrated under reduced pressure. The residue thus obtained was purified by silica gel column chromatography (silica gel, methylene chloride/ethyl acetate) to obtain a first intermediate, Compound c6 (179 mg, 0.885 mmol, yield 88%) as a colorless solid substance.

(2) Synthesis of Intermediate Compound e6

Compound c6 (179 mg, 0.885 mmol), piperonal (Compound d) (199 mg, 1.33 mmol), sodium hydroxide (42.5 mg, 1.06 mmol), water (0.1 mL) and methanol (4.4 mL) were mixed. The mixed solution was stirred at 65° C. for 4.5 hours. After the reaction solution was cooled to ambient temperature, water (10 mL) was added. A solid substance was separated by filtration and washed with water and methanol. The resulting residue was dried under reduced pressure to obtain a second intermediate, Compound e6 (284 mg, 0.849 mmol, yield 96%) as a yellow solid substance.

(3) Synthesis of Desired Compound No. 6

Compound e6 (284 mg, 0.849 mmol), tetrahydrofuran (4.3 mL), and methanol (4.3 mL) were mixed. To the mixed solution, NaBH$_4$ (64.3 mg, 1.70 mmol) was added. The reaction solution thus obtained was stirred at ambient temperature for 3 hours. To the resulting reaction solution, ethyl acetate (15 mL) was added. The solution was washed sequentially with water and saturated saline. The organic layer was dried over anhydrous sodium sulfate, filtered and concentrated under reduced pressure. The residue thus obtained was purified by silica gel column chromatography (amine silica gel, hexane/ethyl acetate) to obtain a desired product, compound No. 6 (263 mg, 0.782 mmol, yield 92%) as a light-yellow solid substance.

[Synthesis of Compound No. 7]

[Formula 15]

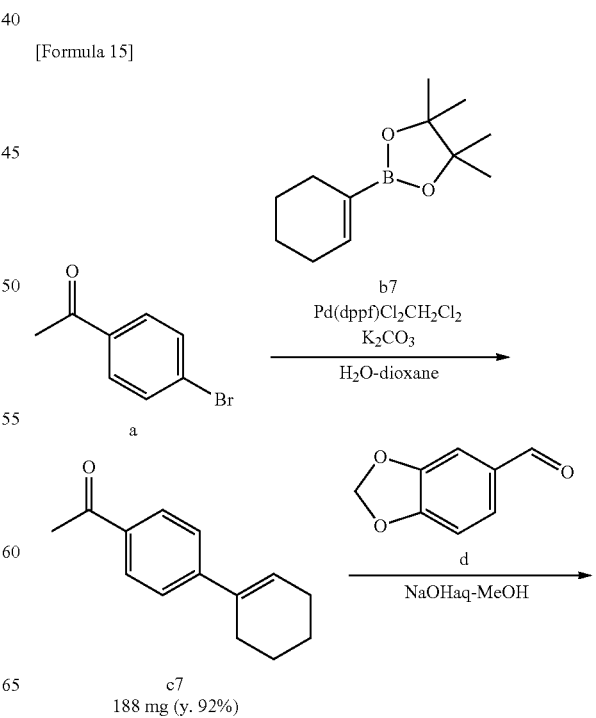

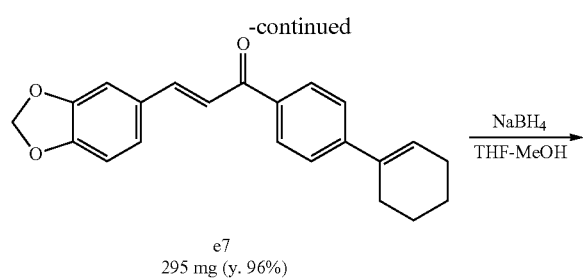

e7
295 mg (y. 96%)

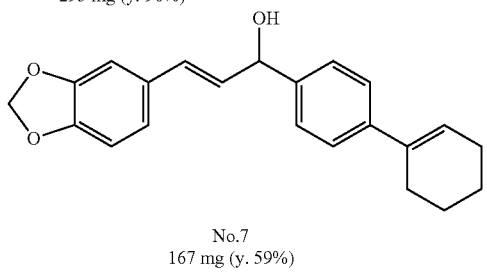

No.7
167 mg (y. 59%)

(1) Synthesis of Intermediate Compound c7

4'-Bromoacetophenone (Compound a) (200 mg, 1.01 mmol), 1-cyclohexeneboronic acid pinacol (Compound b7) (209 mg, 1.01 mmol), Pd(dppf)Cl$_2$·CH$_2$Cl$_2$ (82.1 mg, 0.101 mmol), K$_2$CO$_3$ (278 mg, 2.01 mmol), water (1.0 mL) and 1,4-dioxane (1.7 mL) were mixed. The mixed solution was subjected to nitrogen purge, and stirred at 80° C. for 1.5 hours. After the reaction solution was cooled to ambient temperature, 2 N hydrochloric acid (10 mL) was added. The resulting reaction solution was stirred for 10 minutes, and a solid substance was separated by filtration (filtration aid: cellulose) and washed with ethyl acetate. To the filtrate, ethyl acetate (15 mL) was added. The resulting filtrate was washed sequentially with water and saturated saline. The organic layer was dried over anhydrous sodium sulfate, filtered and concentrated under reduced pressure. The residue thus obtained was purified by silica gel column chromatography (silica gel, methylene chloride/ethyl acetate) to obtain a first intermediate Compound c7 (186 mg, 0.929 mmol, yield 92%) as a colorless solid substance.

(2) Synthesis of Intermediate Compound e7

Compound c7 (186 mg, 0.929 mmol), piperonal (Compound d) (209 mg, 1.39 mmol), sodium hydroxide (44.6 mg, 1.11 mmol), water (0.1 mL) and methanol (4.6 mL) were mixed. The mixed solution was stirred at 65° C. for 2.5 hours. After the reaction solution was cooled to ambient temperature, water (10 mL) was added. A solid substance was separated by filtration and washed with water and methanol. The residue was dried under reduced pressure to obtain a second intermediate, Compound e7 (295 mg, 0.887 mmol, yield 96%) as a light-yellow solid substance.

(3) Synthesis of Desired Compound No. 7

Compound e7 (295 mg, 0.887 mmol), tetrahydrofuran (4.2 mL), and methanol (4.2 mL) were mixed. To the mixed solution, NaBH$_4$ (63.7 mg, 1.69 mmol) was added. The reaction solution was stirred at ambient temperature for 1.5 hours. To the reaction solution, ethyl acetate (15 mL) was added. The resulting solution was washed sequentially with water and saturated saline. The organic layer was dried over anhydrous sodium sulfate, filtered and concentrated under reduced pressure. The residue thus obtained was purified by silica gel column chromatography (amine silica gel, hexane/ethyl acetate) to obtain a desired product, Compound No. 7 (167 mg, 0.499 mmol, yield 59%) as a colorless solid substance.

Synthesis of Compound No. 8

[Formula 16]

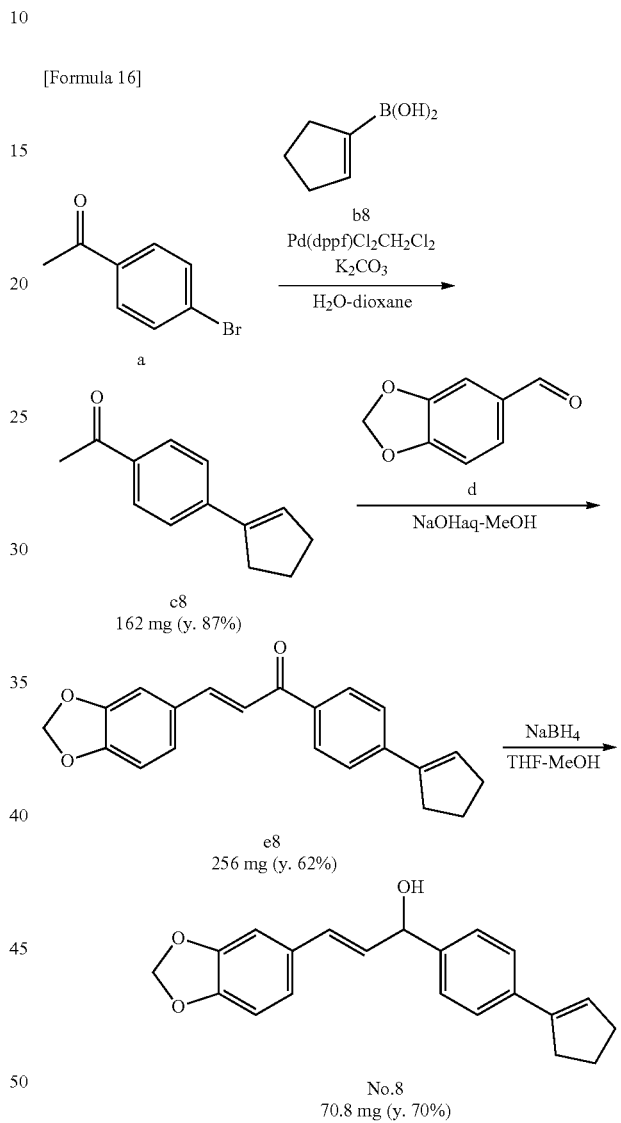

(1) Synthesis of Intermediate Compound c8

4'-Bromoacetophenone (Compound a) (200 mg, 1.01 mmol), 1-cyclopentenylboronic acid (Compound b8) (113 mg, 1.01 mmol), Pd(dppf)Cl$_2$·CH$_2$Cl$_2$ (82.1 mg, 0.101 mmol), K$_2$CO$_3$ (278 mg, 2.01 mmol), water (1.0 mL) and 1,4-dioxane (1.7 mL) were mixed. The mixed solution was subjected to nitrogen purge, and stirred at 80° C. for 2.5 hours. After the reaction solution was cooled to ambient temperature, 2 N hydrochloric acid (10 mL) was added. The resulting reaction solution was stirred for 10 minutes, and a solid substance was separated by filtration (filtration aid: cellulose) and washed with ethyl acetate. To the filtrate, ethyl acetate (15 mL) was added. The resulting filtrate was washed sequentially with water and saturated saline. The organic layer was dried over anhydrous sodium sulfate, filtered and concentrated under reduced pressure. The residue thus obtained was purified by silica gel column chromatography (silica gel, methylene chloride/ethyl acetate) to obtain a first intermediate, Compound c8 (162 mg, 0.870 mmol, yield 87%) as a colorless solid substance.

(2) Synthesis of Intermediate Compound e8

Compound c8 (162 mg, 0.870 mmol), piperonal (Compound d) (196 mg, 1.31 mmol), sodium hydroxide (41.8 mg, 1.04 mmol), water (0.1 mL) and methanol (4.4 mL) were mixed. The mixed solution was stirred at 65° C. for 13 hours. After the reaction solution was cooled to ambient temperature, water (10 mL) was added. A solid substance was separated by filtration and washed with water and methanol. The residue was dried under reduced pressure to obtain a second intermediate, Compound e8 (256 mg, 0.804 mmol, yield 92%) as a yellow solid substance.

(3) Synthesis of Desired Compound No. 8

Compound e8 (100 mg, 0.314 mmol), tetrahydrofuran (1.6 mL), and methanol (1.6 mL) were mixed. To the mixed solution, NaBH$_4$ (23.8 mg, 0.628 mmol) was added. The reaction solution was stirred at ambient temperature for one hour and admixed with ethyl acetate (15 mL). The resulting solution was washed sequentially with water and saturated saline. The organic layer was dried over anhydrous sodium sulfate, filtered and concentrated under reduced pressure. The residue thus obtained was purified by silica gel column chromatography (silica gel, hexane/methylene chloride). A fraction containing a desired product was concentrated, and the resultant residue was purified by silica gel column chromatography (amine silica gel, hexane/ethyl acetate) to obtain a desired product, Compound No. 8 (70.8 mg, 0.221 mmol, yield 70%) as a colorless solid substance.

Synthesis of Compound No. 10

[Formula 17]

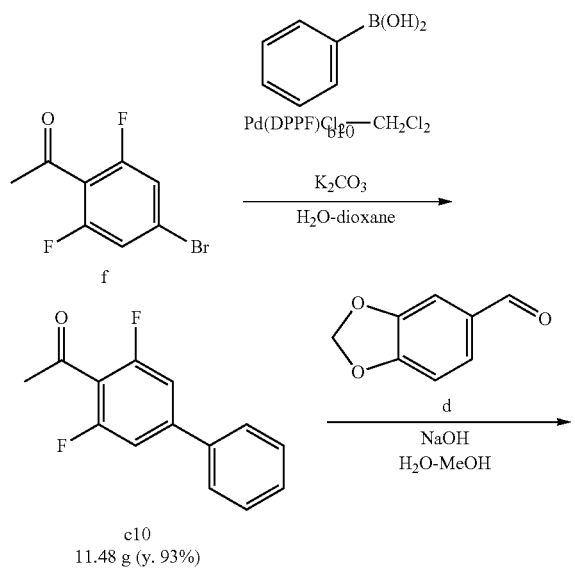

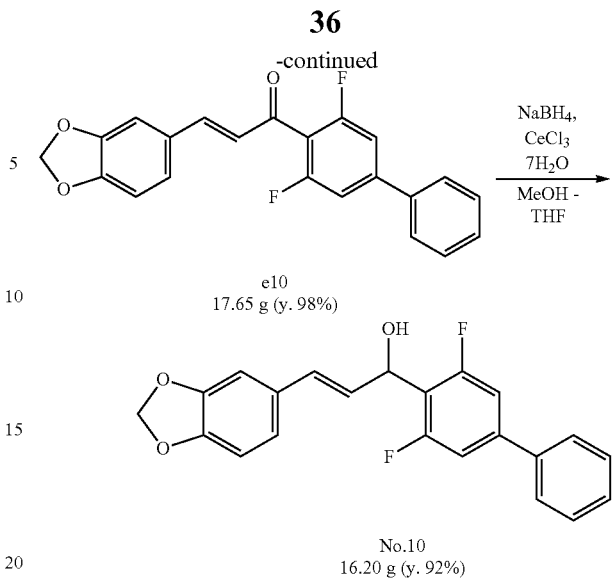

(1) Synthesis of Intermediate Compound c10

1-(4-Bromo-2,6-difluorophenyl)ethanone (Compound f) (12.5 g, 53.2 mmol), phenylboronic acid (Compound b10) (6.48 g, 53.2 mmol), Pd(dppf)Cl$_2$·CH$_2$Cl$_2$ (2.17 g, 2.66 mmol), K$_2$CO$_3$ (14.7 g, 106 mmol), water (53 mL) and 1,4-dioxane (89 mL) were mixed. The mixed solution was subjected to nitrogen purge, and stirred at 80° C. for 3 hours. After the reaction solution was cooled to ambient temperature, 2 N hydrochloric acid (75 mL) was added. The reaction solution was stirred for 30 minutes, and a solid substance was separated by filtration (filtration aid: cellulose) and washed with ethyl acetate. To the filtrate, ethyl acetate (50 mL) was added. The resulting filtrate was washed sequentially with water and saturated saline. The organic layer was dried over anhydrous sodium sulfate, filtered and concentrated under reduced pressure. The residue thus obtained was dissolved in dichloromethane and filtered (filtration aid: silica gel). The filtrate was washed with dichloromethane and concentrated under reduced pressure. The resultant residue was purified by silica gel column chromatography (silica gel, methylene chloride/ethyl acetate) to obtain a first intermediate, Compound c10 (11.48 g, 49.4 mmol, yield 93%) as a pink solid substance.

(2) Synthesis of Intermediate Compound e10

Compound c10 (11.48 g, 49.4 mmol), piperonal (Compound d) (11.1 g, 74.2 mmol), sodium hydroxide (2.37 g, 59.3 mmol), water (4.9 mL) and methanol (247 mL) were mixed. The mixed solution was stirred at 65° C. for 2 hours. After the reaction solution was cooled to ambient temperature, water (100 mL) was added. A solid substance was separated by filtration and washed with water and methanol. The residue was dried under reduced pressure to obtain a second intermediate, Compound e10 (17.65 g, 48.4 mmol, yield 98%) as a yellow solid substance.

(3) Synthesis of Desired Compound No. 10

Compound e10 (17.6 g, 48.2 mmol), cerium chloride (III) heptahydrate (21.5 g, 57.8 mmol), tetrahydrofuran (240 mL) and methanol (120 mL) were mixed. The mixed solution was stirred at ambient temperature for 20 minutes and cooled in an ice bath, and then admixed with NaBH$_4$ (2.19 g, 57.8 mmol). The reaction solution was stirred at ambient temperature for 30 minutes. To the reaction solution, ethyl acetate (250 mL) was added. The resultant solution was washed sequentially with water and saturated saline. The organic layer was dried over anhydrous sodium sulfate, filtered and concentrated under reduced pressure. To the residue thus obtained, isopropyl alcohol (200 mL) was added. A solid substance was separated by filtration and washed with isopropyl alcohol. The residue was dried under reduced pressure to obtain a desired product, Compound No. 10 (16.20 g, 44.2 mmol, yield 92%) as a colorless solid substance.

<Evaluation Method>

Evaluation of Lactate Dehydrogenase Inhibitory Action (Compounds Nos. 1 to 10, FIGS. 1 to 5):

Lactate dehydrogenase catalyzes production of lactic acid and NAD from pyruvic acid and NADH. More specifically, if lactate dehydrogenase activity is high, the amount of NADH decreases, whereas, if lactate dehydrogenase activity is inhibited, the amount of NADH does not decrease. In order to evaluate the enzymatic activity of lactate dehydrogenase, experiments were carried out using an evaluation system (Patent Literature 1, Non-Patent Literature 9) consisting of an enzymatic reaction (step 1) and a chromogenic reaction (step 2). In the enzymatic reaction of step 1, sodium pyruvate (100 μM), NADH (100 μM) and lactate dehydrogenase (human LDH1 or LDH5) were added, further an inhibitor (Compounds Nos. 1 to 10) different in concentration was added. The mixture was subjected to a reaction carried out in the presence of a 100 mM sodium phosphate buffer (pH 7.3, 37° C.) for 60 minutes (200 μL/well). In this stage, absorbance of the background at 492 nm was measured by a plate reader (absorbance before chromogenic reaction). In the subsequent chromogenic reaction of step 2, in order to determine the amount of the remaining NADH in the enzymatic reaction of step 1, a coloring solution having diaphorase (25 U/mL) and INT (5 mM) dissolved therein was added in an amount of 100 μL/well and a reaction was carried out for 10 minutes. INT changed into INT formazan by the action of diaphorase in the presence of NADH, and absorbance of INT formazan at 492 nm was measured by a plate reader (absorbance after chromogenic reaction). Herein, if lactate dehydrogenase is inhibited, NADH remains, and absorption thereof at 492 nm is exhibited. Then, the absorbance before chromogenic reaction was subtracted from the absorbance after chromogenic reaction. The value obtained by the above calculation was regarded as an "absorbance change value (ΔA)". Further, the absorbance obtained when the above reaction was carried out in the absence of an inhibitor was regarded as "0% control value", whereas, the absorbance obtained when the above reaction was carried out in the absence of not only an inhibitor but also lactate dehydrogenase (LDH1, LDH5) was regarded as "100% control value". The inhibition rates (%) shown in FIGS. 1 to 5 were calculated with the following math formula:

100×(ΔA in the presence of inhibitor−0% control value)/(100% control value−0% control value).

If lactate dehydrogenase is completely inhibited, 100% is given, whereas, if not, 0% is given based on the math formula.

Pharmacokinetic evaluation (compounds Nos. 1, 2, 4 and 9, FIGS. 6 to 10) by oral administration to a mouse:

For pharmacokinetic study, 6-7 week-old ICR mice were used in experiments. Since the compound No. 1, and Compounds No. 2, No. 4, and No. 9 were all highly soluble in lipid, a vehicle containing an oily solvent, triglyceride and a surfactant, polyoxyethylene castor oil, was used for oral administration. A vehicle or each of the compounds (50 mg/kg) were respectively orally administered to a mouse by a disposable sonde. Thirty minutes later, each mouse was decapitated for sampling their blood. Heparin sodium (10 μg/mL) was added to the blood as an anticoagulant. After each blood sample was centrifuged for 15 minutes (1,000 g, 4° C.), the supernatant was obtained as a blood plasma. Subsequently, to extract a compound, ethyl acetate was added to the obtained blood plasma, air-dried with nitrogen gas, and dissolved again with acetonitrile. The sample pretreated in this manner was subjected to the following analysis (HPLC, MS). In performing the HPLC analysis, constituents of the blood plasma were separated by the HPLC system (manufactured by JASCO Corporation) using a C18 reverse-phase column, at a flow rate of 1.0 mL/min. For analysis of the compound No. 1, a mobile phase consisting of acetonitrile (80%) and water (20%) was used, whereas a mobile phase consisting of acetonitrile (70%) and water (30%) was used for analysis of Compounds No. 2, No. 4 and No. 9. Individual compounds were detected by a UV detector at 295 nm. The data were obtained/analyzed by a software, ChromNAV (manufactured by JASCO Corporation). To identify an unchanged compound within the blood plasma constituents, the compound itself was directly analyzed as a standard substance by HPLC and the retention times of these compounds were compared. In the MS analysis, LC-MS/MS system (Agilent 1200 HPLC-Chip and 6520 Accurate-Mass Q-TOF), manufactured by Agilent Technologies, was used. The pretreated sample was allowed to adsorb onto a C18 chip by use of a mobile phase consisting of acetonitrile (25%) and water (75%) containing formic acid (0.1%), and thereafter, the blood plasma constituents were separated by a mobile phase consisting of acetonitrile (60%) and water (40%) containing formic acid (0.1%). The MS spectrum of the blood plasma constituents separated was detected (obtained) by a mass spectrometer, and data was obtained/analyzed by a software, MassHunter Qualitative Analysis (Agilent Technologies).

Pharmacological Effect Evaluation by Using a Hippocampal Sclerosis Model Mouse (Compound No. 2, FIG. 11):

Hippocampal sclerosis model mice for use in evaluating anti-epileptic action were prepared according to the literatures already published (Non-Patent Literatures 3 and 13). First, 6-7 week-old ICR mice were each anesthetized with a mixed solution of ketamine (100 mg/kg) and xylazine (40 mg/kg) and fixed to a stereotaxic apparatus. Subsequently, the scalp was removed and a U-shaped plastic frame required for recording electroencephalography in vivo was attached to the head. Then, a small amount of kainic acid (0.8 nmol, 40 nL) for inducing epilepsy was injected to the dorsal hippocampus (1.6 mm posterior to the bregma, 1.6 mm laterally from the center line, 1.4 mm (depth) from the brain surface) via a micro glass electrode and a metal electrode (diameter 200 μm) for measuring epileptic seizures was embedded in the proximity of the injection site of kainic acid. A reference electrode was installed in the cerebellum. Three weeks after the surgery, epileptic seizures spontaneously generated from the hippocampus were measured to evaluate anti-epilepsy action. Each mouse head was immobilized via a U-shaped frame, brain waves of the hippocampus was recorded through an analog filter of 0.5-30 Hz and digitized by an AD converter at a sampling rate of 1 kHz. After baseline brain wave was measured for one hour, a vehicle or Compound No. 2 was orally administered to each mouse by a disposable sonde, and their brain waves were recorded for further 3 hours. Epileptic seizures were analyzed by Igor Pro (WaveMetrics) and epileptic seizures lasting for 8 seconds or more were counted. Statistical analysis was carried out by SigmaPlot (Systat Software).

<Results>

First, the lactate dehydrogenase inhibitory activity of a novel stiripentol derivative (Compound No. 2) was examined and compared to that of a stiripentol derivative (the compound No. 1) of the prior invention (Patent Literature 1) (FIG. 1). Lactate dehydrogenase is a metabolic enzyme, which is a tetramer consisting of two subunits (LDHA, LDHB). Then, the inhibitory activities of a stiripentol derivative against a LDHA tetramer (LDH5) and a LDHB tetramer (LDH1) were examined. First, the inhibitory activity against LDHA was examined. As a result, the compound No. 1 (the prior invention) exerted inhibitory activity at a concentration as low as 5 µM (FIG. 1A, open circle, n=3). This result is almost consistent with the result of the prior invention (Patent Literature 1). Herein, Compound No. 2, which was obtained by substituting a carbonyl group with a hydroxy group, was found to exert an inhibitory activity at the same concentration (FIG. 1A, filled circle, n=3). Then, the inhibitory activity against LDHB was examined. The two compounds exerted almost the same strong inhibitory activity (FIG. 1B, each n=3). In other words, it was demonstrated that the novel stiripentol derivative (Compound No. 2) found herein also has a strong lactate dehydrogenase inhibitory activity.

Compound No. 2 represented by formula (3A-1) is a novel compound and its lactate dehydrogenase inhibitory action and usefulness as a medicament (active ingredient) have not been reported. Not only, Compound No. 2, which is a compound represented by formula (1A) wherein R is a phenyl group, but also a compound represented by formula (1A) wherein R is any one of the other substituents, has not been reported. To confirm whether a compound, represented by formula (1A) except Compound No. 2, and a compound, prepared by further introducing a substituent and represented by formula (1B), have lactate dehydrogenase inhibitory action, Compounds No. 3 to No. 10, represented by predetermined structural formulae shown in Table 1 and included in formula (1A) or formula (1B), were newly synthesized and subjected to enzymatic activity evaluation. As a result, it was found that Compounds No. 3 to No. 10 all have a distinctive lactate dehydrogenase inhibitory activity, although the inhibitory activity more or less differs from that of Compound No. 2 (FIGS. 2 to 5, each n=3). To summarize, it was demonstrated that compounds represented by formula (1A) and prepared by substituting a carbonyl group of a compound, represented by formula (III) as disclosed in the prior invention, with a hydroxy group; and compounds, represented by formula (1B) and prepared by further introducing a substituent, serve as a lactate dehydrogenase inhibitor.

Subsequently a stiripentol derivative (the compound No. 1) according to the prior art and having a carbonyl group and novel stiripentol derivatives (Compounds No. 2, No. 4, and No. 9) having a hydroxy group were evaluated for in vivo metabolic stability (FIGS. 6 to 10). First, the compound No. 1 according to the prior invention was orally administered to a mouse (50 mg/kg). Thirty minutes later, the blood plasma constituents were analyzed by HPLC. As a result, a plurality of peaks were observed although they were not observed in a mouse administered with a vehicle (FIGS. 6A, B). These peaks were derived from the compound No. 1. Further these peaks were compared with HPLC peaks of a standard sample (FIG. 6C). As a result, it was identified that a peak probably derived from the unchanged compound No. 1 appears at almost the same HPLC retention time (FIG. 6B, pointed by arrow).

However, the peak derived from the compound No. 1 (FIG. 6B) in the blood plasma sample is slightly shifted from the peak (FIG. 6C) of the compound No. 1 as the standard sample. Because of this, it is considered that a metabolized compound may present in the blood plasma sample. Then, with respect to the peak derived from the compound No. 1 (FIG. 6B, pointed by arrow) in the blood plasma sample, mass spectrometry was carried out using LC-MS (FIG. 7). The molecular weight of the compound No. 1 was 328.37 and the accurate mass (m/z) of a protonated molecule thereof in a positive mode was 329.12. Then, the extracted ion chromatogram (EIC) at m/z=329.12 was checked. As a result, a larger EIC peak appeared when the compound No. 1 was orally administered (FIG. 7A). That is, the unchanged compound No. 1 is detected (present) in the blood. However, when the MS spectra with respect to the peaks of the blood plasma of a mouse administered with a vehicle and the blood plasma of a mouse administered with the compound No. 1 were obtained, and then the subtracted spectrum was calculated (obtained), a subtracted MS peak was observed at m/z=329.12 but an MS peak larger than this was observed at m/z=331.13 (FIG. 7C). Then, EIC at m/z=331.13 was checked. As a result, it was found that EIC peak (FIG. 7B) observed at m/z=331.13 in the blood plasma of a mouse administered with the compound No. 1 is apparently larger than the EIC peak (FIG. 7A) observed at m/z=329.12. More specifically, it was demonstrated that the in vivo metabolic stability of the compound No. 1 according to the prior invention is low and observed in the blood after oral administration but the unchanged compound quickly disappears.

Then, a novel stiripentol derivative, Compound No. 2, was orally administered to a mouse (50 mg/kg). Thirty minutes later, the blood plasma constituents were analyzed by HPLC (FIG. 8). As a result, it was observed that there are two HPLC peaks derived from Compound No. 2, one is a large peak at 5.1 min and the other is a small peak at 5.4 min (FIGS. 8, A and B), although the peaks were not observed in the case of a mouse administered with a vehicle. Then, this was compared to the HPLC peak (FIG. 8C) of a standard sample of Compound No. 2, whose retention time was completely consistent with that of the 5.1 min peak derived from Compound No. 2 (FIG. 8B, pointed by arrow). More specifically, it was demonstrated that a novel stiripentol derivative Compound No. 2 has high in vivo metabolic stability, and that the concentration of unchanged Compound No. 2 is maintained in the blood after it is orally administered. When Compound No. 4 and Compound No. 9 were subjected to the same HPLC analysis, the same results as in the above-mentioned Compound No. 2 were obtained. More specifically, the retention times of the HPLC peaks in the blood plasma were completely consistent with those in the standard sample. From this, it was demonstrated that they have high in vivo metabolic stability, and that the concentration of each of the unchanged compounds is maintained in the blood after it is orally administered (FIGS. 9, A and B; FIGS. 10, A and B).

Finally, when a novel stiripentol derivative, Compound No. 2, was orally administered, anti-epileptic action was evaluated as in vivo pharmacological effect (FIG. 11). In a model mouse with "temporal lobe epilepsy with hippocampal sclerosis" known as drug-resistant epilepsy typically observed in adults (Non-Patent Literatures 3 and 13), spontaneous epileptic seizure is observed (FIGS. 11, A and B, Baseline). When a vehicle (control) was orally administered to the model mouse, epileptic seizure did not change (FIG. 11A, Vehicle). However, when Compound No. 2 was orally administered, epileptic seizure was suppressed (FIG. 11B, Compound No. 2). In summary data, the number of seizures was not changed by administration of the vehicle. However, when Compound No. 2 was administered, a significant decrease in the number of seizures was observed one hour after the administration (FIG. 11C, each n=10). When dose dependency was checked, it was found that the number of seizures significantly decreases at a dose of 50 mg/kg by oral administration (FIG. 11D, n=20 for 0 mg/kg [vehicle], n=11 for 50 mg/kg, n=10 for 150 mg/kg, n=9 for 300 mg/kg). These results suggest that epileptic seizure in an intractable epilepsy model can be suppressed by oral administration of a novel stiripentol derivative, Compound No. 2.

Those skilled in the art can understand, based on Examples disclosed above, that lactate dehydrogenase inhibitory action, metabolic stability and usefulness as a medicament (active ingredient) exhibited by Compound No. 2 to Compound No. 10 can apply to all compounds represented by formulae (3A) to (7A) or formulae (3B) to (7B) having different substituents R' from those of the aforementioned predetermined compounds; all compounds represented by formula (2A) or formula (2B) having different type of Ring A as R from those of the aforementioned predetermined compounds; all compounds represented by formula (1A) or formula (1B) having a substituent except Ring A as R; and finally, all compounds represented by formula (1), to which a substituent except R, $R^a$ to $R^d$ is introduced in formula (1A) or formula (1B).

The invention claimed is:

1. A compound represented by the following formula (1):

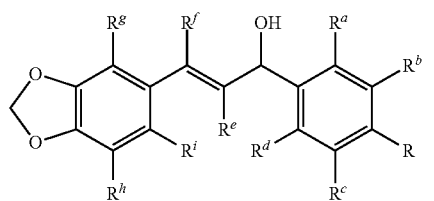

(1)

wherein

R represents a monovalent substituent of an aromatic or non-aromatic 5 or 6-membered ring which may be unsubstituted or substituted with one to three substituents selected from the group consisting of a halogen atom, a hydroxy group, an oxo group, a sulfanyl group, a sulfo group, an amino group, an imino group, a nitro group, a formyl group, a carboxy group, a thiocarboxy group, a carbamoyl group, a thiocarbamoyl group and a cyano group; and $R^a$, $R^b$, $R^c$, $R^d$, $R^e$, $R^f$, $R^g$, $R^h$ and $R^i$ each independently represent a hydrogen atom or a halogen atom selected from the group consisting of a fluorine atom, a chlorine atom, a bromine atom and an iodine atom;

or a pharmaceutically acceptable salt or solvate thereof.

2. The compound according to claim 1, wherein the aromatic or non-aromatic 5 or 6-membered ring is a phenyl group, a pyridyl group, a thienyl group, a cyclohexenyl group or a cyclopentenyl group.

3. The compound according to claim 1, wherein $R^e$, $R^f$, $R^g$, $R^h$ and $R^i$ are all hydrogen atoms.

4. The compound according to claim 3, wherein $R^a$, $R^b$, $R^c$ and $R^d$ are all hydrogen atoms.

5. The compound according to claim 3, wherein at least one of $R^a$, $R^b$, $R^c$ and $R^d$ is a halogen atom selected from the group consisting of a fluorine atom, a chlorine atom, a bromine atom and an iodine atom.

6. A lactate dehydrogenase inhibitor comprising the compound according to claim 1, or a pharmaceutically acceptable salt or solvate thereof.

7. A medicament comprising the compound according to claim 1, or a pharmaceutically acceptable salt or solvate thereof, as an active ingredient.

* * * * *